US012793361B2

(12) United States Patent
Nagano et al.

(10) Patent No.: US 12,793,361 B2
(45) Date of Patent: Nov. 10, 2026

(54) INFORMATION PROCESSING DEVICE AND METHOD FOR ADJUSTING A 3D OBJECT USING A FINGER-CONTROLLED ADJUSTMENT AXIS

(71) Applicant: Sony Group Corporation, Tokyo (JP)

(72) Inventors: Keijiroh Nagano, Tokyo (JP); Ikuo Yamano, Tokyo (JP); Kei Takahashi, Tokyo (JP); Tsuyoshi Ishikawa, Tokyo (JP); Shin Shiroma, Tokyo (JP)

(73) Assignee: Sony Group Corporation, Tokyo (JP)

( * ) Notice: Subject to any disclaimer, the term of this patent is extended or adjusted under 35 U.S.C. 154(b) by 114 days.

(21) Appl. No.: 18/869,308

(22) PCT Filed: May 24, 2023

(86) PCT No.: PCT/JP2023/019269
§ 371 (c)(1),
(2) Date: Nov. 26, 2024

(87) PCT Pub. No.: WO2023/238663
PCT Pub. Date: Dec. 14, 2023

(65) Prior Publication Data

US 2025/0209752 A1 Jun. 26, 2025

(30) Foreign Application Priority Data

Jun. 7, 2022 (JP) ................................ 2022-092457

(51) Int. Cl.
*G06T 19/00* (2011.01)
*G06F 3/01* (2006.01)
(Continued)

(52) U.S. Cl.
CPC .............. *G06T 19/006* (2013.01); *G06F 3/01* (2013.01); *G06F 3/011* (2013.01); *G06F 3/014* (2013.01);
(Continued)

(58) Field of Classification Search
None
See application file for complete search history.

(56) References Cited

U.S. PATENT DOCUMENTS

2014/0300547 A1 10/2014 Hosenpud et al.
2015/0049002 A1* 2/2015 Ishikawa ................ G06F 3/012 345/8
(Continued)

FOREIGN PATENT DOCUMENTS

JP 2005-084817 A 3/2005
JP 2017-513126 A 5/2017
(Continued)

OTHER PUBLICATIONS

International Search Report and Written Opinion mailed on Jul. 11, 2023, received for International Application No. PCT/JP2023/019269, filed on May 24, 2023, 9 pages including English Translation.

*Primary Examiner* — Michael J Cobb
(74) *Attorney, Agent, or Firm* — XSENSUS LLP

(57) ABSTRACT

The present disclosure relates to an information processing device and an information processing method capable of improving the operability of a 3D object. An axis attitude determination unit determines the attitude of an adjustment axis on the basis of the attitude of a finger of a user, the adjustment axis serving as a reference for performing an adjustment process for a 3D object disposed in the three-dimensional space on computer graphics so as to be superimposed on the real space, and changes and fixes the attitude of the adjustment axis. An adjustment processing unit performs the adjustment process for the 3D object according to an operation by the user in accordance with the axial direction of the adjustment axis at the fixed attitude. The present technology is applicable to an AR system that
(Continued)

displays a 3D object as superimposed on the real space, for example.

20 Claims, 24 Drawing Sheets

(51) Int. Cl.
*G06F 3/0346* (2013.01)
*G06T 19/20* (2011.01)

(52) U.S. Cl.
CPC .............. *G06F 3/016* (2013.01); *G06F 3/017* (2013.01); *G06F 3/0346* (2013.01); *G06T 19/00* (2013.01); *G06T 19/20* (2013.01); *G06T 2219/2004* (2013.01); *G06T 2219/2016* (2013.01)

(56) References Cited

U.S. PATENT DOCUMENTS

| | | | | |
|---|---|---|---|---|
| 2015/0279110 | A1* | 10/2015 | Kimura | G06T 19/006 345/633 |
| 2017/0329488 | A1 | 11/2017 | Welker et al. | |
| 2023/0244312 | A1* | 8/2023 | Sawai | G06F 3/0346 345/156 |
| 2023/0290092 | A1* | 9/2023 | Tanaka | G06V 40/28 |

FOREIGN PATENT DOCUMENTS

| | | | |
|---|---|---|---|
| JP | 2022-078623 | A | 5/2022 |
| WO | 2021/177132 | A1 | 9/2021 |

* cited by examiner

INFORMATION PROCESSING DEVICE AND METHOD FOR ADJUSTING A 3D OBJECT USING A FINGER-CONTROLLED ADJUSTMENT AXIS

CROSS-REFERENCE TO RELATED APPLICATIONS

The present application is a national stage application, pursuant to 35 U.S.C. § 371, of International Patent Application No. PCT/JP2023/019269, filed May 24, 2023, which claims priority from Japanese Patent Application No. 2022-092457, filed Jun. 7, 2022, the entire contents of each are incorporated herein by reference.

TECHNICAL FIELD

The present disclosure relates to an information processing device and an information processing method, and more particularly, to an information processing device and an information processing method capable of improving the operability of a 3D object.

BACKGROUND ART

In the related art, to move or rotate a 3D object displayed through AR (Augmented Reality) or VR (Virtual Reality), an operation to "grip" the 3D object is performed by a hand of a user to perform an operation to move or rotate the 3D object in accordance with the motion of the hand of the user.

For example, PTL 1 discloses a technique of correcting the position of a virtual object, displayed through AR by a plurality of AR devices, between the AR devices.

CITATION LIST

Patent Literature

[PTL 1]
WO 2021/177132

SUMMARY

Technical Problem

When a 3D object is operated as discussed above, the axis as the reference for the operation is not fixed. Therefore, the 3D object may be operated in a direction not expected by the user, and it has been desired to improve operability.

The present disclosure has been made in view of such circumstances, and makes it possible to improve the operability of a 3D object.

Solution to Problem

An aspect of the present disclosure provides an information processing device including: an axis attitude determination unit that determines an attitude of an adjustment axis on the basis of an attitude of a finger of a user, the adjustment axis serving as a reference for performing an adjustment process for a 3D object disposed in a three-dimensional space on computer graphics so as to be superimposed on a real space, and that changes and fixes the attitude of the adjustment axis; and an adjustment processing unit that performs the adjustment process for the 3D object according to an operation by the user in accordance with an axial direction of the adjustment axis at the fixed attitude.

An aspect of the present disclosure provides an information processing method that causes an information processing device to perform a process including: determining an attitude of an adjustment axis on the basis of an attitude of a finger of a user, the adjustment axis serving as a reference for performing an adjustment process for a 3D object disposed in a three-dimensional space on computer graphics so as to be superimposed on a real space, and changing and fixing the attitude of the adjustment axis; and performing the adjustment process for the 3D object according to an operation by the user in accordance with an axial direction of the adjustment axis at the fixed attitude.

In an aspect of the present disclosure, an attitude of an adjustment axis is determined on the basis of an attitude of a finger of a user, the adjustment axis serving as a reference for performing an adjustment process for a 3D object disposed in a three-dimensional space on computer graphics so as to be superimposed on a real space, and the attitude of the adjustment axis is changed and fixed; and the adjustment process for the 3D object according to an operation by the user is performed in accordance with an axial direction of the adjustment axis at the fixed attitude.

DESCRIPTION OF EMBODIMENTS

Hereinafter, specific embodiments to which the present technology is applied will be described in detail with reference to the drawings.

<Configuration Example of AR System>

Figure 1:
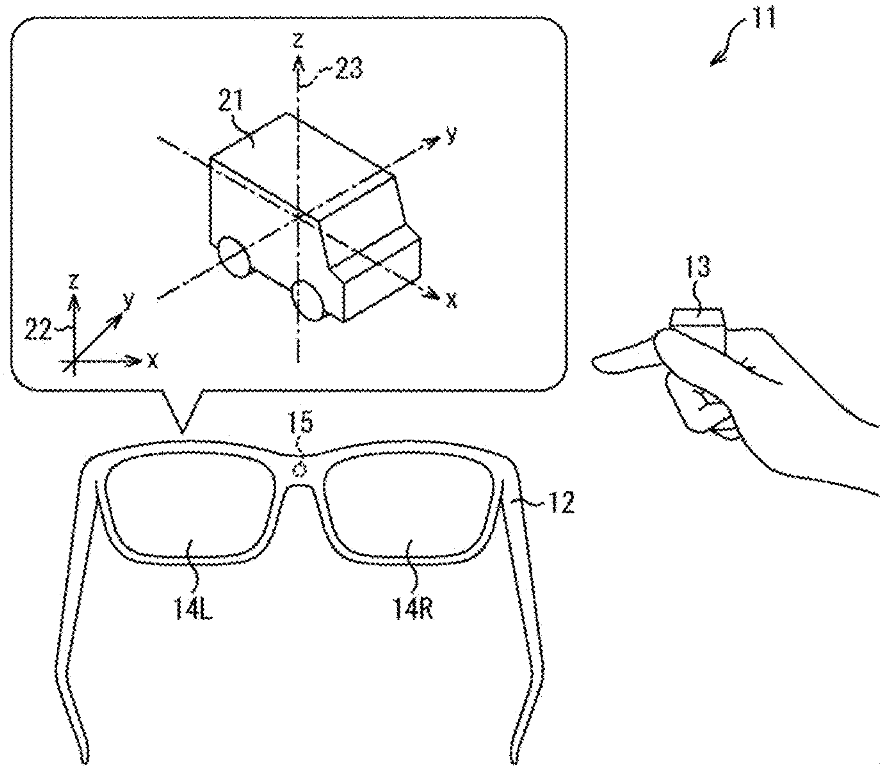
FIG. 1 illustrates an example of the configuration of an embodiment of an AR system to which the present technology is applied.

FIG. 1 illustrates an example of the configuration of an embodiment of an AR system to which the present technology is applied.

An AR system 11 illustrated in FIG. 1 is configured to include a glasses-type wearable terminal 12 and a ring-type device 13.

The glasses-type wearable terminal 12 is configured to be shaped so as to be wearable by a user as with common glasses, and configured to be provided with a transmissive display unit 14L and a transmissive display unit 14R in lens portions of glasses. The glasses-type wearable terminal 12 is also configured to be provided with a camera 15 at a position at which the camera 15 can capture the field of view of the user wearing the glasses-type wearable terminal 12.

The transmissive display unit 14L and the transmissive display unit 14R display a 3D object 21 expressed through computer graphics, and transmits light in a region other than the region in which the 3D object 21 is displayed. Thus, the user can visually recognize the 3D object 21 displayed by the transmissive display unit 14L and the transmissive display unit 14R as if the 3D object 21 were disposed as superimposed on the real space.

For example, the 3D object 21 displayed by the transmissive display unit 14L and the transmissive display unit 14R is displayed in accordance with a world coordinate system 22 as a coordinate system that defines the entire three-dimensional space on the computer graphics. In addition, the 3D object 21 is provided with a local coordinate system 23 that defines the front-rear direction, the left-right direction, and the up-down direction of the 3D object 21 with the center of the 3D object 21 serving as the origin, for example.

The camera 15 can capture motion of a hand, a finger, etc., of the user, for example.

The ring-type device 13 is an input device that is used to input an operation by the user for the 3D object 21, and is used in the state of being worn on an index finger of the user as illustrated in the drawing, for example.

In the AR system 11, for example, when the user makes touch-on (change from non-contact to contact) on a touch pad 33 (FIG. 2) of the ring-type device 13, an operation to "grip" the 3D object 21 contacted or entered by the fingertip of the index finger is performed. Then, while the operation to "grip" the 3D object 21 is being performed, the 3D object 21 is fixed to the fingertip of the user, allowing the 3D object 21 to be moved or rotated in accordance with motion of the fingertip of the user. At this time, the AR system 11 can estimate the position of the fingertip of the user using the ring-type device 13, or recognize the position of the fingertip of the user on the basis of a video captured by the camera 15.

After that, when the user makes touch-off (change from contact to non-contact) on the touch pad 33 (FIG. 2) of the ring-type device 13, the operation to "grip" the 3D object 21 is canceled. Consequently, the state in which the 3D object 21 is fixed to the fingertip of the user is canceled. Thus, the 3D object 21 is fixed at the position and the attitude at which the 3D object 21 is disposed in the three-dimensional space at the timing when the user makes touch-off, allowing the 3D object 21 to be kept in the air, for example.

Further, the AR system 11 can perform an adjustment process for the 3D object 21, as that to be discussed later, using the ring-type device 13.

Figure 2:
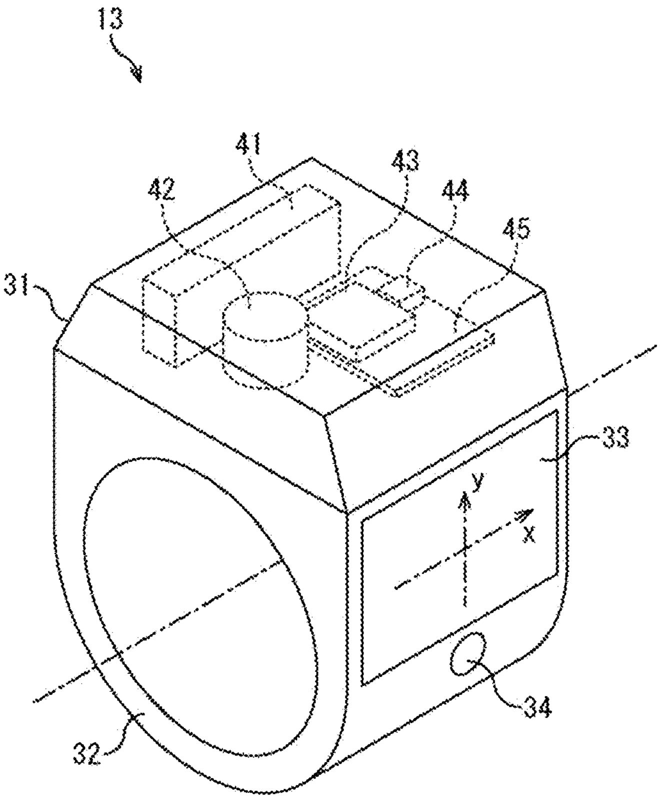
FIG. 2 is a perspective view illustrating an example of a schematic configuration of a ring-type device.

FIG. 2 is a perspective view illustrating an example of a schematic configuration of the ring-type device 13.

As illustrated in FIG. 2, the ring-type device 13 is configured to include a body portion 31, a belt portion 32, a touch pad 33, and a tactile switch 34.

The body portion 31 is configured to include, integrated therein, a battery 41, a vibration actuator 42, an audio module 43, an IMU (Inertial Measurement Unit) 44, a wireless communication substrate 45, etc. In the body portion 31, the various portions are driven using electric power supplied from the battery 41, causing the vibration actuator 42 to vibrate, the audio module 43 to output a sound, the IMU 44 to measure the three-dimensional angular velocity and acceleration of the ring-type device 13, and the wireless communication substrate 45 to communicate with the glasses-type wearable terminal 12, for example.

The belt portion 32 is used to allow the ring-type device 13 to be worn on a finger of the user. For example, the user can fix the ring-type device 13 to his/her index finger by inserting his/her index finger into the belt portion 32 along the constant chain line indicated in the drawing and thereafter adjusting the fitting of the belt portion 32.

The touch pad 33 is provided on a side surface of the belt portion 32, and detects a touch operation by the user on the surface of the touch pad 33. For example, the user can wear the ring-type device 13 on his/her index finger such that the touch pad 33 faces the thumb side as illustrated in FIG. 1, to be able to perform a touch operation on the touch pad 33 using his/her thumb. As indicated by X- and Y-axes in the drawing, operation axes are set for the touch pad 33, with a direction along the axis of the belt portion 32 on the surface of the touch pad 33 defined as an X-axis direction and with a direction orthogonal to the X-axis direction defined as a Y-axis direction.

The tactile switch 34 is a switch to be turned on only while being pressed by a finger of the user and to be turned off when the user releases his/her finger, for example. FIG. 2 illustrates a configuration example in which the tactile switch 34 is disposed below the touch pad 33. However, a configuration in which the tactile switch 34 is disposed on the back surface of the touch pad 33 so that the tactile switch 34 is turned on when the user presses the touch pad 33 may also be used.

Figure 3:
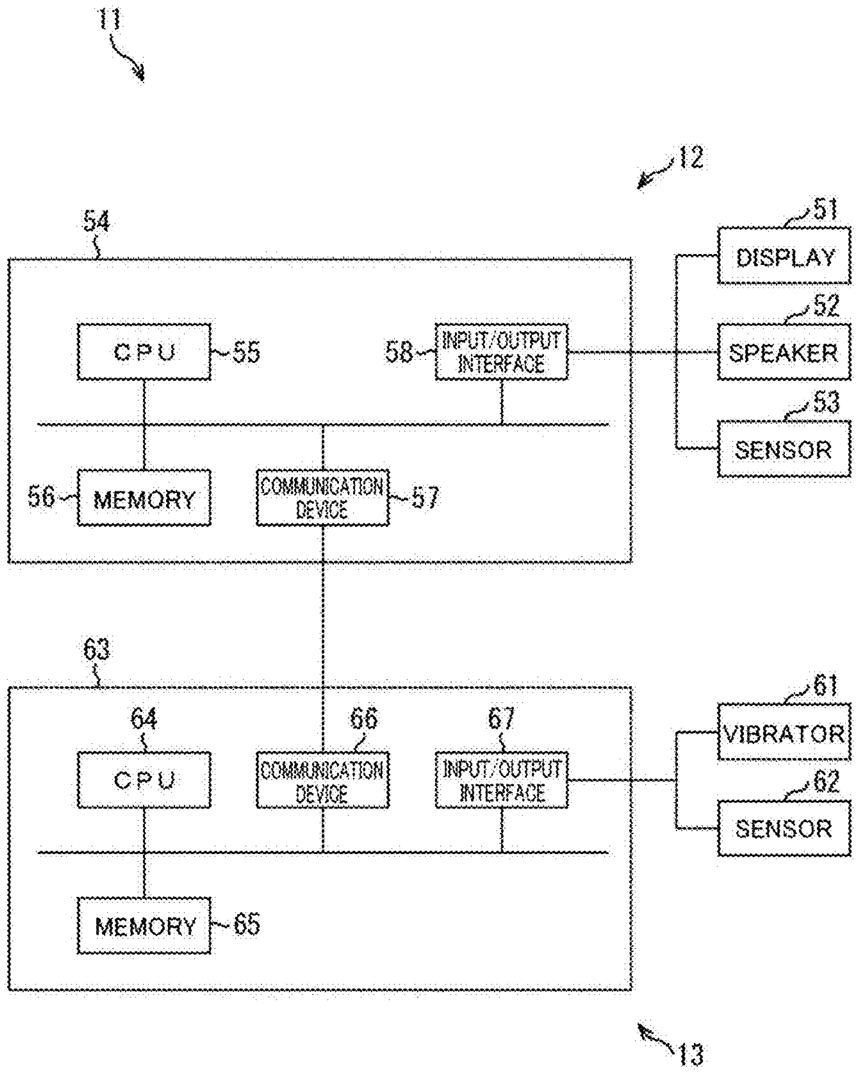
FIG. 3 is a block diagram illustrating an example of the hardware configuration of an AR system.

FIG. 3 is a block diagram illustrating an example of the hardware configuration of the AR system 11.

As illustrated in FIG. 3, the glasses-type wearable terminal 12 is configured such that a display 51, a speaker 52, and a sensor 53 are connected to a device body 54.

The display 51 is constituted by the transmissive display unit 14L and the transmissive display unit 14R in FIG. 1, and displays a 3D object 21, adjustment axes 25 (FIG. 6), etc., in accordance with visual data supplied from the device body 54, for example.

The speaker 52 outputs a sound in accordance with sound data supplied from the device body 54.

The sensor 53 is constituted by the camera 15 in FIG. 1, and supplies visual data captured by the camera 15 to the device body 54, for example.

The device body 54 is configured to include, integrated therein, a CPU 55, a memory 56, a communication device 57, and an input/output interface 58. The CPU 55 controls the various portions of the glasses-type wearable terminal 12 by executing a program. The memory 56 stores data required for various processes executed in the glasses-type wearable terminal 12. The communication device 57 communicates with the ring-type device 13. The input/output interface 58 performs data input and output with the display 51, the speaker 52, and the sensor 53.

The ring-type device 13 is configured such that a vibrator 61 and a sensor 62 are connected to a device body 63.

The vibrator 61 is constituted by the vibration actuator 42 in FIG. 2, and vibrates in accordance with tactile data supplied from the device body 54, for example.

The sensor 62 is constituted by the IMU 44 in FIG. 2, and supplies angular velocity data and acceleration data on the ring-type device 13 measured by the IMU 44 to the device body 63, for example.

The device body 63 is configured to include, integrated therein, a CPU 64, a memory 65, a communication device 66, and an input/output interface 67. The CPU 64 controls the various portions of the ring-type device 13 by executing a program. The memory 65 stores data required for various processes executed in the ring-type device 13. The communication device 66 communicates with the glasses-type wearable terminal 12. The input/output interface 67 performs data input and output with the vibrator 61 and the sensor 62.

The glasses-type wearable terminal 12 may be various head-mounted displays that are used in optical see-through AR, video see-through AR, VR, etc. A part of the hardware configuration of the glasses-type wearable terminal 12 may be implemented by a personal computer (not illustrated). Alternatively, the glasses-type wearable terminal 12 may be replaced with a projector or a large or small display device. In the AR system 11, the ring-type device 13 may not be used, and the function of the ring-type device 13 may be integrated in the glasses-type wearable terminal 12. In the AR system 11, an operation terminal that is used to operate a robot, a drone, etc., can be used, for example.

Figure 4:
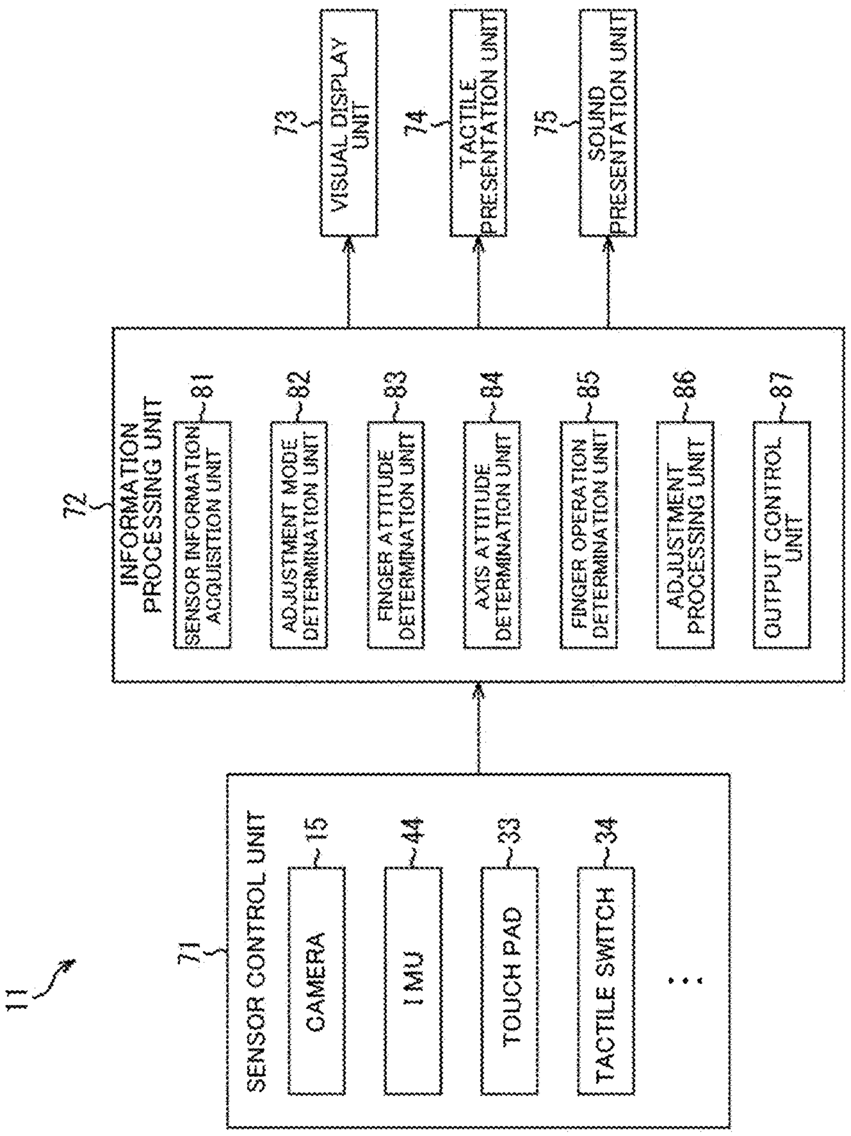
FIG. 4 is a block diagram illustrating an example of the functional configuration of the AR system.

FIG. 4 is a block diagram illustrating an example of the functional configuration of the AR system 11.

As illustrated in FIG. 4, the AR system 11 is configured to include a sensor control unit 71, an information processing unit 72, a visual display unit 73, a tactile presentation unit 74, and a sound presentation unit 75.

The sensor control unit 71 controls the camera 15 in FIG. 1, the IMU 44, the touch pad 33, and the tactile switch 34 in FIG. 2, etc., for example. Then, the sensor control unit 71 supplies the information processing unit 72 with the visual data captured by the camera 15, the angular velocity data and the acceleration data on the ring-type device 13 measured by the IMU 44, touch position data detected by the touch pad 33, on/off data detected by the tactile switch 34, etc.

In addition, the sensor control unit 71 can control various sensors such as an RGB camera and a depth camera (not illustrated). Such sensors can be disposed in an environment in which the AR system 11 is used, or attached to a part of the body of the user other than the face or a hand, for example, rather than being provided in the glasses-type wearable terminal 12 or the ring-type device 13. A single sensor or a plurality of sensors may be provided.

The information processing unit 72 is configured to include a sensor information acquisition unit 81, an adjustment mode determination unit 82, a finger attitude determination unit 83, an axis attitude determination unit 84, a finger operation determination unit 85, an adjustment processing unit 86, and an output control unit 87.

The sensor information acquisition unit 81 acquires, as sensor information, the visual data, the angular velocity data and the acceleration data on the ring-type device 13, the touch position data for the touch pad 33, the on/off data for the tactile switch 34, etc., supplied from the sensor control unit 71.

The adjustment mode determination unit 82 determines whether or not to make a transition to an adjustment mode in which an adjustment process for the 3D object 21 is performed, and whether or not to end the adjustment mode, on the basis of the sensor information acquired by the sensor information acquisition unit 81, such as the visual data or the angular velocity data or the acceleration data on the ring-type device 13, for example.

The finger attitude determination unit 83 acquires bone position-attitude information that indicates the position and the attitude of each finger by analyzing the skeletal frame of the fingers of the user captured in the visual data acquired by the sensor control unit 71. The finger attitude determination unit 83 also acquires device position-attitude information that indicates the position and the attitude of the ring-type device 13 on the basis of the angular velocity data and the acceleration data on the ring-type device 13 acquired by the sensor control unit 71. Then, the finger attitude determination unit 83 can determine the attitude of the fingers of the user on the basis of the bone position-attitude information and the device position-attitude information. Besides, the finger attitude determination unit 83 may determine the attitude of the fingers of the user using depth information acquired by a depth sensor (not illustrated) as well.

The axis attitude determination unit 84 determines the attitude of the adjustment axes 25 (FIG. 6), as the reference for an adjustment process for the 3D object 21, on the basis of the attitude of the fingers of the user determined by the finger attitude determination unit 83, and changes and fixes the attitude of the adjustment axes 25. For example, the axis attitude determination unit 84 determines the attitude of the adjustment axes 25 so as to coincide with the attitude of the adjustment axes (X- and Y-axes in FIG. 2) for the touch pad 33 of the ring-type device 13 on the basis of the device position-attitude information on the ring-type device 13 supplied from the finger attitude determination unit 83, and displays the adjustment axes 25. Further, the axis attitude determination unit 84 changes the attitude of the adjustment axes 25 in accordance with variations in the attitude of the adjustment axes for the touch pad 33 of the ring-type device 13 when the user is not in touch with the touch pad 33. On the other hand, the axis attitude determination unit 84 fixes the attitude of the adjustment axes 25 when the user is in touch with the touch pad 33.

The finger operation determination unit 85 determines an operation by a finger of the user on the basis of the touch position data for the touch pad 33 and the on-off data for the tactile switch 34 acquired by the sensor control unit 71. For example, the finger operation determination unit 85 can determine whether or not the touch pad 33 is touched, the touch position and the amount of movement of a touch on the touch pad 33, and whether the tactile switch 34 is on or off.

The adjustment processing unit 86 performs an adjustment process of moving the position of the 3D object 21, turning the attitude of the 3D object 21, and increasing/reducing the size of the 3D object 21 on the basis of the touch position and the amount of movement of a touch on the touch pad 33 determined by the finger operation determination unit 85 when the user is in touch with the touch pad 33.

The output control unit 87 controls output of visual data to the visual display unit 73, output of tactile data to the tactile presentation unit 74, and output of sound data to the sound presentation unit 75.

The visual display unit 73 is constituted by the transmissive display unit 14L and the transmissive display unit 14R in FIG. 1, and displays a video based on the visual data supplied from the output control unit 87, for example.

The tactile presentation unit 74 is constituted by the vibration actuator 42 in FIG. 2, and presents a tactile feel through vibration based on the tactile data supplied from the output control unit 87, for example.

The sound presentation unit 75 is constituted by the audio module 43 in FIG. 2, and presents a sound based on the sound data supplied from the output control unit 87.

<Adjustment Mode Determination Range>

An adjustment mode determination range 24 will be described with reference to FIG. 5.

In the AR system 11, for example, an adjustment mode determination range 24 for determining a transition and an end of the adjustment mode in which an adjustment process for the 3D object 21 is performed is set around the 3D object 21.

Figure 5:
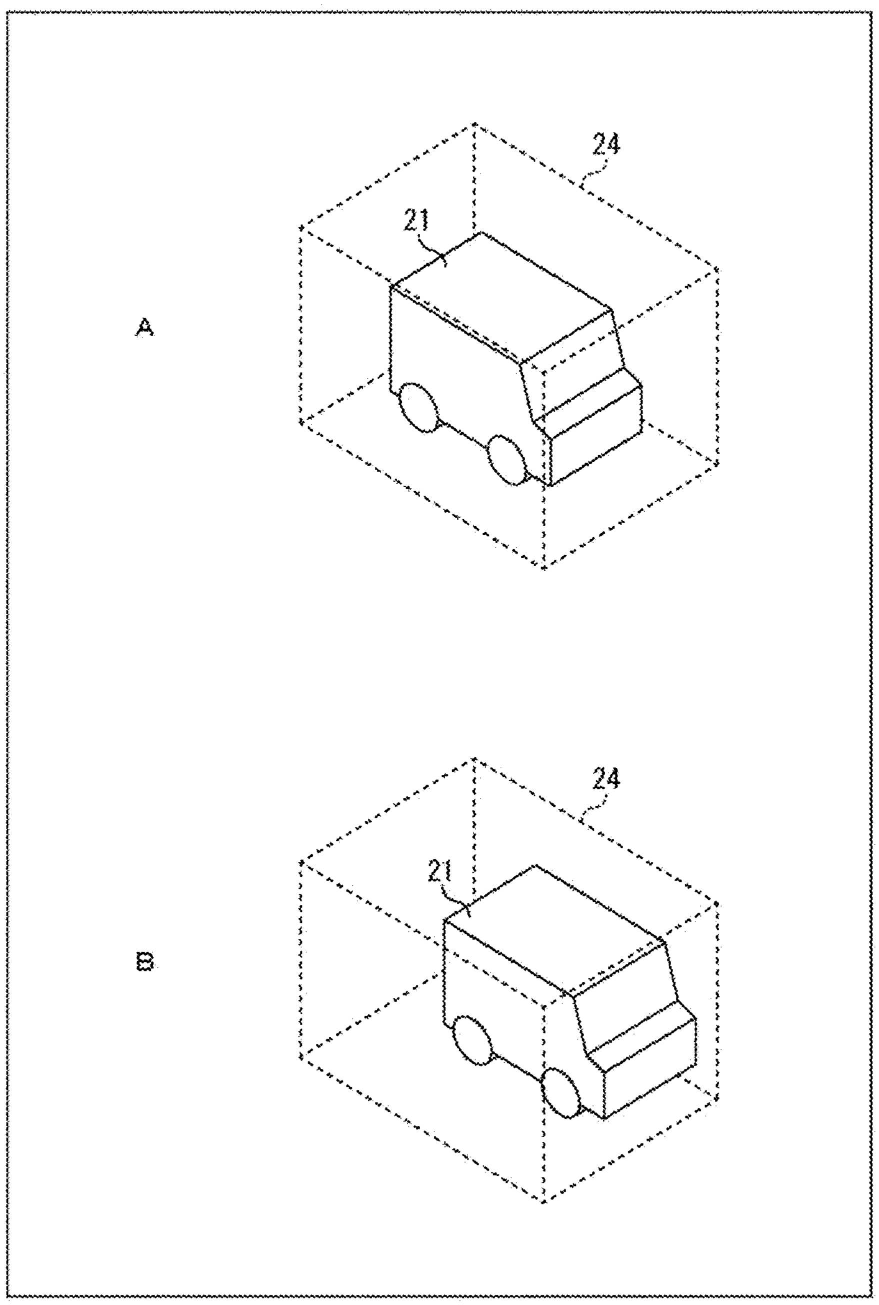
FIG. 5 illustrates an adjustment mode determination range.

For example, the adjustment mode determination range 24 is set in a certain range around the 3D object 21 as illustrated in A of FIG. 5. A transition is made to the adjustment mode when the user moves his/her finger wearing the ring-type device 13 closer to the 3D object 21 and the fingertip is located at a position within the adjustment mode determination range 24 and at which the fingertip is not in contact with the 3D object 21. After that, the adjustment mode is ended when the user moves his/her finger wearing the ring-type device 13 away from the 3D object 21 and the fingertip is located at a position outside the adjustment mode determination range 24.

Here, when the position of the 3D object 21 is adjusted in the adjustment mode, the position of the adjustment mode determination range 24 can be adjusted together with the 3D object 21 so that the positional relationship of the adjustment mode determination range 24 relative to the 3D object 21 is not changed. Alternatively, when the position of the 3D object 21 is adjusted in the adjustment mode, the position of the adjustment mode determination range 24 may be kept fixed so that the positional relationship of the adjustment mode determination range 24 relative to the 3D object 21 is changed as illustrated in B of FIG. 5.

In the AR system 11, a transition and an end of the adjustment mode may be determined without using the adjustment mode determination range 24.

For example, a transition may be made to the adjustment mode when the user moves his/her finger wearing the ring-type device 13 closer to the 3D object 21 and performs an operation of clicking, double-clicking, or holding down the tactile switch 34. After that, the adjustment mode can be ended when the user performs an operation of clicking, double-clicking, or holding down the tactile switch 34.

Similarly, a transition may be made to the adjustment mode when the user moves his/her finger wearing the ring-type device 13 closer to the 3D object 21 and performs an operation of single-tapping, double-tapping, or holding down the touch pad 33. After that, the adjustment mode can be ended when the user performs an operation of single-tapping, double-tapping, or holding down the touch pad 33.

Alternatively, a transition may be made to the adjustment mode when the user moves his/her finger wearing the ring-type device 13 closer to the 3D object 21 and performs an operation of tapping, double-tapping, or holding down the 3D object 21 with the fingertip. After that, the adjustment mode can be ended when the user taps, double-taps, or holds down the 3D object 21 with the fingertip. Besides, a specific gesture such as a finger snap may be used. Such motion of the fingertip can be detected by the IMU 44, the camera 15, etc.

<Adjustment Axes>

The adjustment axes 25 displayed in the adjustment mode will be described with reference to FIGS. 6 to 9.

Figure 6:
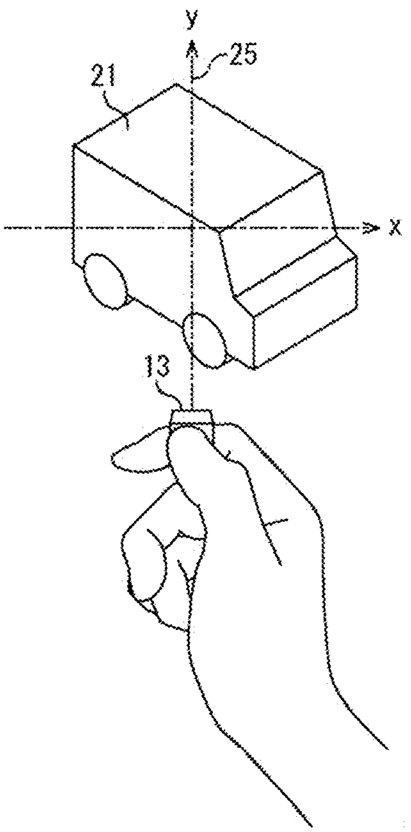
FIG. 6 illustrates adjustment axes displayed in an adjustment mode.

FIG. 6 illustrates display of the adjustment axes 25.

In the AR system 11, for example, the adjustment axes 25 are displayed in accordance with the origin of the local coordinate system 23 for the 3D object 21 in accordance with the attitude of the touch pad 33 of the ring-type device 13 at the timing of a transition to the adjustment mode. As discussed above, the operation axes (X- and Y-axes in FIG. 2) are set for the surface of the touch pad 33, and the adjustment axes 25 are displayed so as to coincide with the directions of the operation axes. Thus, when a transition is made to the adjustment mode with the X-axis of the operation axes of the touch pad 33 is directed in the horizontal direction and with the Y-axis directed in the vertical direction as illustrated in FIG. 6, the adjustment axes 25 at an attitude at which the X-axis is directed in the horizontal direction and the Y-axis is directed in the vertical direction are displayed for the 3D object 21.

In the AR system 11, the adjustment axes 25 are displayed since the timing when a transition is made to the adjustment mode until the timing when the adjustment mode is ended, allowing the user to recognize whether or not the adjustment mode is activated on the basis of the adjustment axes 25. In that event, feedback may be given through a sound, vibration, etc., or feedback may be given visually by means of other than the adjustment axes 25.

Figure 7:
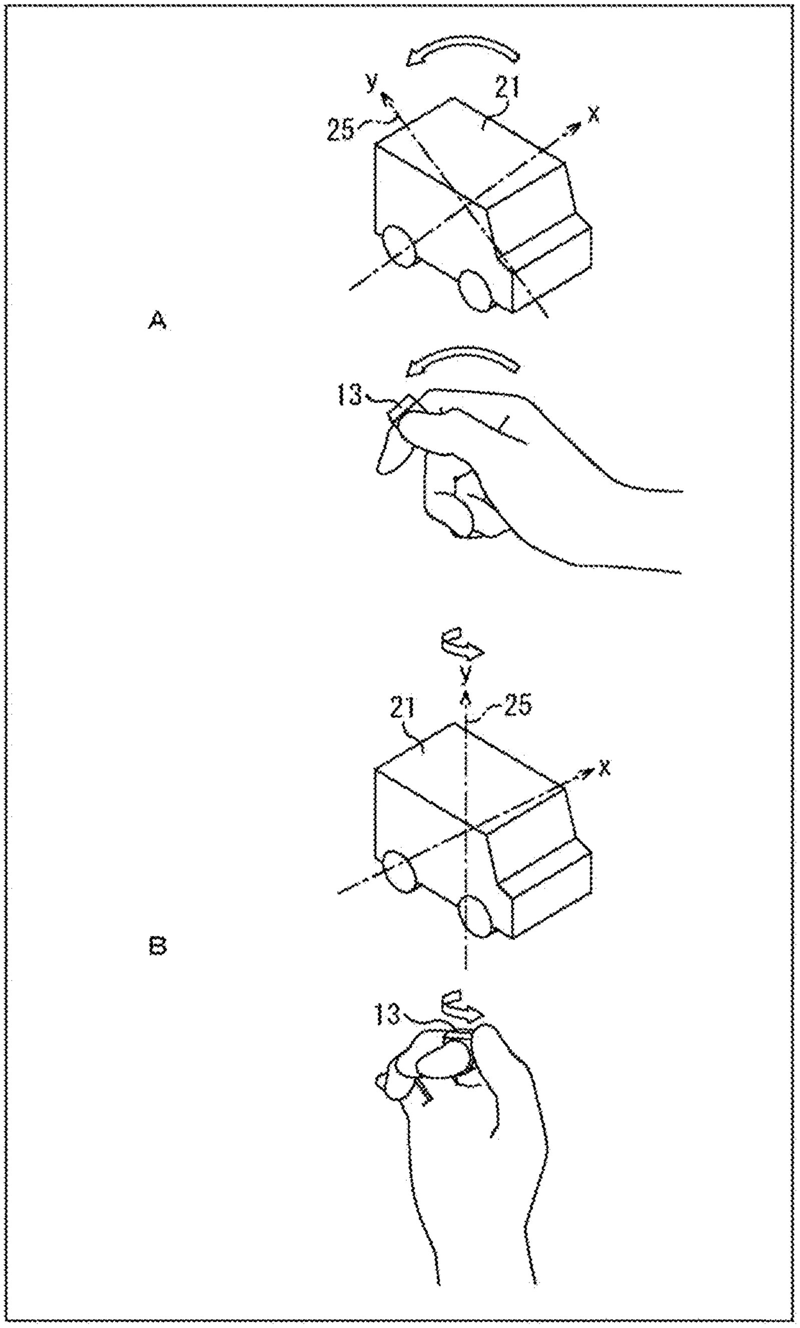
FIG. 7 illustrates an operation to change the attitude of the adjustment axes.

FIG. 7 illustrates an operation to change the attitude of the adjustment axes 25.

In the AR system 11, for example, the user can change the attitude of the adjustment axes 25 displayed in the adjustment mode by tilting the ring-type device 13. That is, when the attitude of the operation axes of the touch pad 33 of the ring-type device 13 is varied, the adjustment axes 25 are displayed with its attitude changed so as to coincide with the attitude of the operation axes.

When the user tilts the ring-type device 13 so as to be rotated leftward about an axis orthogonal to the surface of the touch pad 33 as illustrated in A of FIG. 7, the adjustment axes 25 are displayed as rotated in accordance with the rotational angle of the ring-type device 13.

When the user tilts the ring-type device 13 so as to be rotated leftward about the Y-axis of the surface of the touch pad 33 as illustrated in B of FIG. 7, the adjustment axes 25 are displayed as rotated in accordance with the rotational angle of the ring-type device 13.

Figure 8:
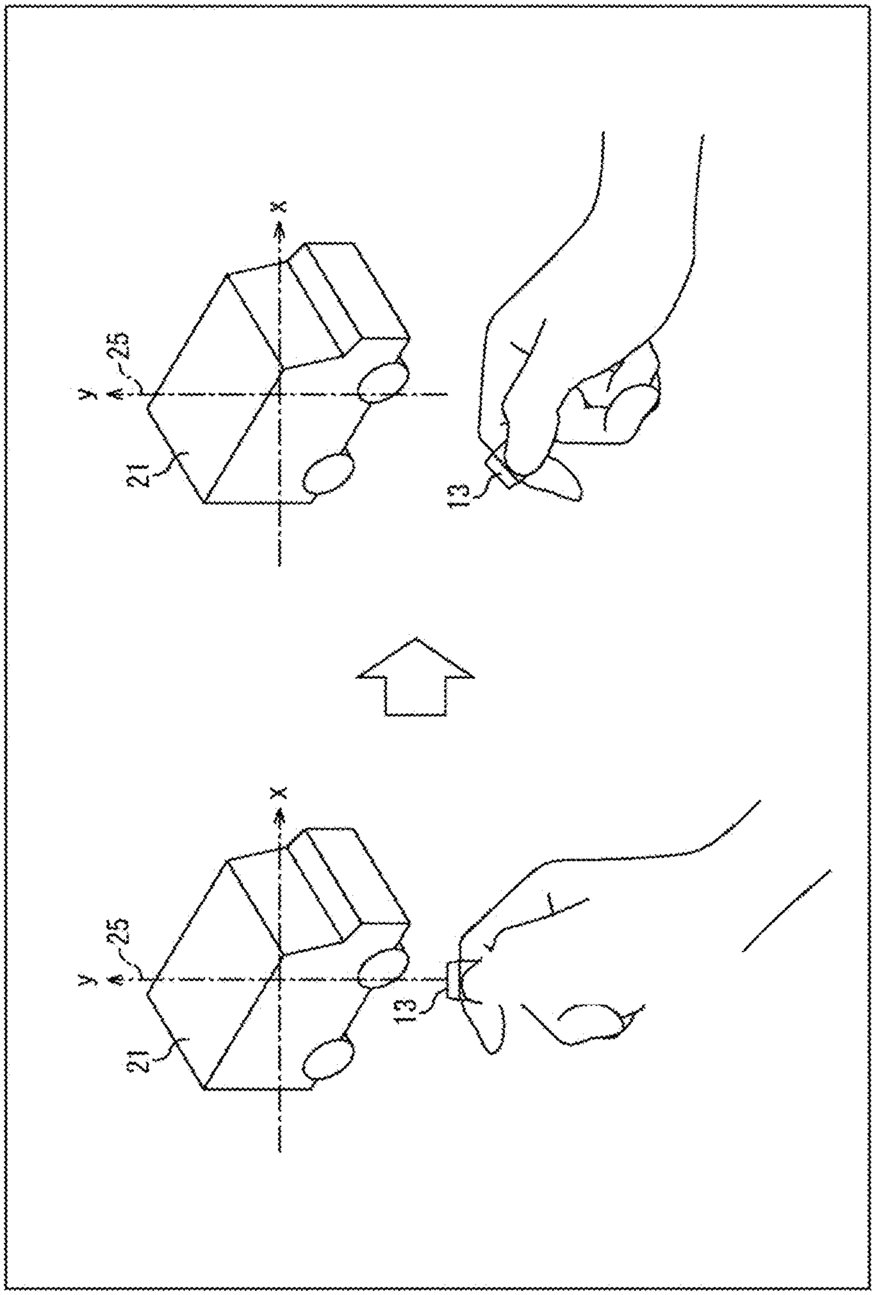
FIG. 8 illustrates an operation to fix the attitude of the adjustment axes.

FIG. 8 illustrates an operation to fix the attitude of the adjustment axes 25.

In the AR system 11, for example, the display of the adjustment axes 25 can be fixed at the attitude at the timing when the tactile switch 34 is turned on while the user is performing an operation to turn on the tactile switch 34 when in the adjustment mode. That is, the attitude of the adjustment axes 25 may not be changed even if the user tilts the ring-type device 13 with the tactile switch 34 kept on.

The attitude of the adjustment axes 25 can be kept fixed even if the user performs an operation to turn on the tactile switch 34 with the adjustment axes 25 displayed as illustrated on the left side of FIG. 8 and tilts the ring-type device 13 as illustrated on the right side of FIG. 8.

After that, when the user performs an operation to turn off the tactile switch 34, the relative relationship between the adjustment axes 25 and the operation axes of the touch pad 33 at the timing when the operation is performed is maintained. That is, offset is caused with the ring-type device 13 tilted with respect to the adjustment axes 25 as illustrated on the right side of FIG. 8, and the attitude of the adjustment axes 25 can be changed by tilting the ring-type device 13 with the offset maintained.

When the user performs a specific cancellation operation such as double-tapping the touch pad 33 or shaking the ring-type device 13, the offset may be canceled, and the adjustment axes 25 may be displayed so as to coincide with the attitude of the operation axes of the touch pad 33.

Figure 9:
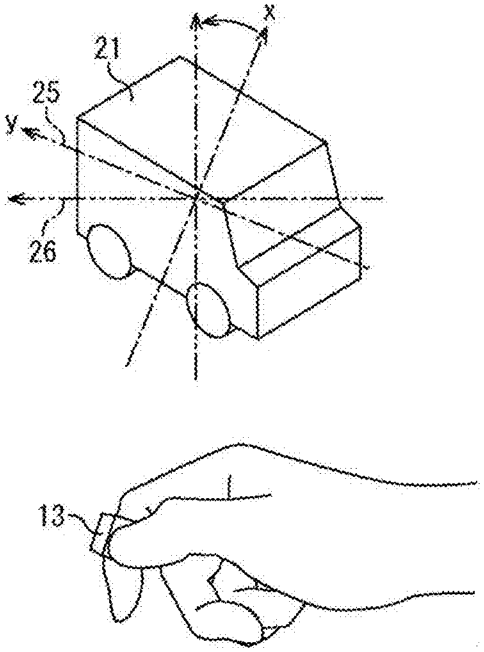
FIG. 9 illustrates an operation to adjust the adjustment axes to a designated angle.

FIG. 9 illustrates an operation to adjust the adjustment axes 25 to a designated angle.

In the AR system 11, for example, a designated angle of the adjustment axes 25 can be set such that the X-axis of the adjustment axes 25 is in the horizontal direction and the Y-axis of the adjustment axes 25 is in the vertical direction when the 3D object 21 is seen from the position of the user. Then, when the user changes the attitude of the adjustment axes 25 by tilting the ring-type device 13, a user interface that indicates the designated angle can be displayed when the present attitude of the adjustment axes 25 reaches a certain angle or less (e.g., ±10° or less) from the designated angle. This allows the user to match the attitude of the adjustment axes 25 with the designated angle.

FIG. 9 illustrates an example in which a user interface 26 that indicates the designated angle is displayed. By displaying the user interface 26 that indicates the designated angle when the present attitude of the adjustment axes 25 is a certain angle or less from the designated angle in this manner, the user can easily match the attitude of the adjustment axes 25 with the designated angle by tilting the attitude of the ring-type device 13 so as to coincide with the user interface 26.

<Adjustment Process for 3D Object>

An adjustment process for the 3D object 21 will be described with reference to FIGS. 10 to 12.

In the AR system 11, for example, an adjustment process of moving the position of the 3D object 21, an adjustment process of turning the attitude of the 3D object 21, and an adjustment process of increasing/reducing the size of the 3D object 21 can be performed. Switching can be made among the adjustment processes by single-tapping, double-tapping, or holding down the touch pad 33, clicking, double-clicking, or holding down the tactile switch 34, etc.

Figure 10:
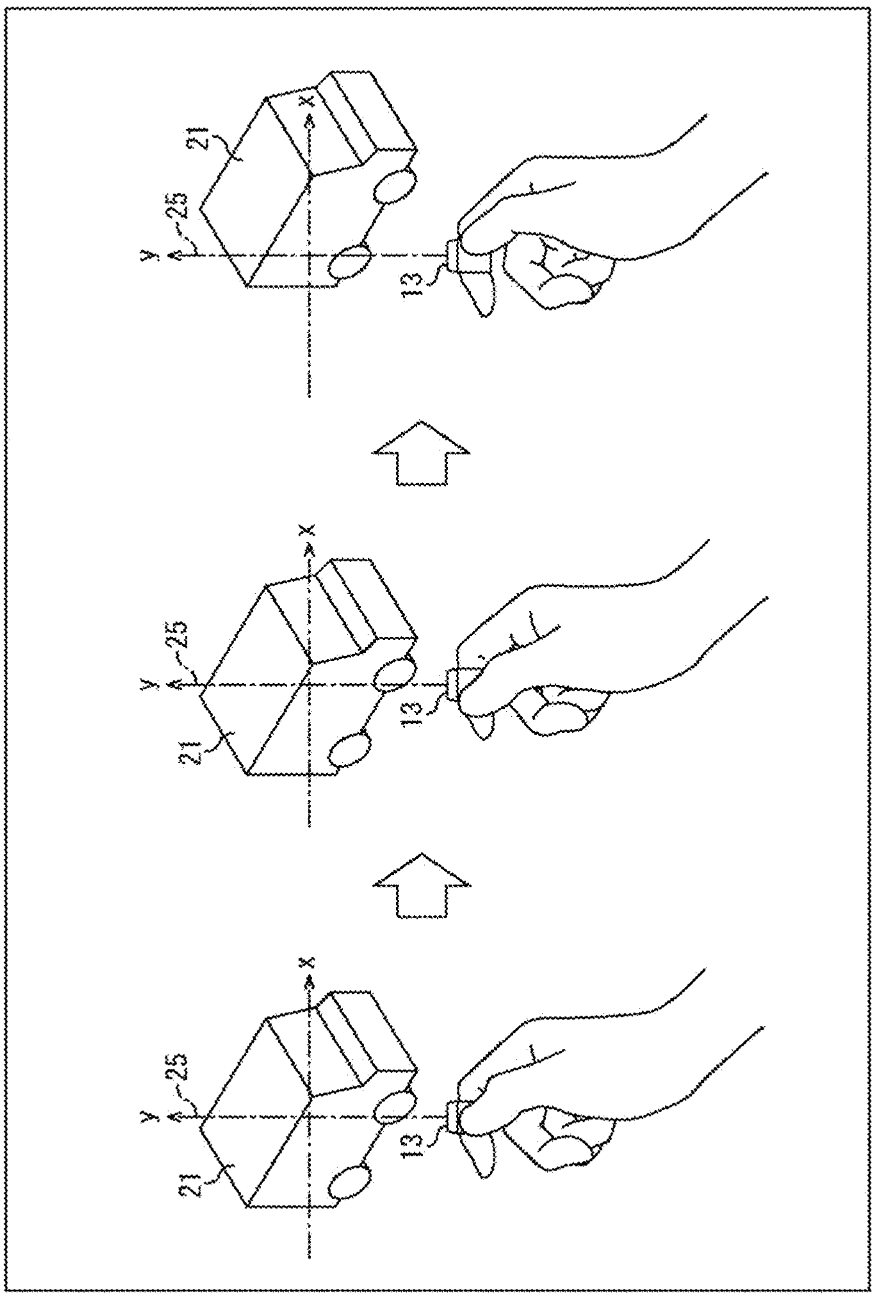
FIG. 10 illustrates an adjustment process of moving the position of a 3D object.

FIG. 10 illustrates an adjustment process of moving the position of the 3D object 21.

When a transition is made to the adjustment mode, the adjustment axes 25 are displayed for the 3D object 21, as illustrated on the left side of FIG. 10, for example. Then, when the user touches the left side of the touch pad 33 as illustrated in the center of FIG. 10 and performs an operation to move the touch to the right side of the touch pad 33 as illustrated on the right side of FIG. 10 while maintaining the touch, the position of the 3D object 21 is moved toward the right side of the X-axis of the adjustment axes 25 in accordance with the amount of movement of the touch. At this time, even if the ring-type device 13 is tilted while the user is performing an operation to move the touch, the adjustment axes 25 are in a fixed state continuously while the touch is detected.

When the user performs an operation to move the touch from the right side toward the left side of the touch pad 33, the position of the 3D object 21 is moved toward the left side of the X-axis of the adjustment axes 25. When the user performs an operation to move the touch from the upper side toward the lower side of the touch pad 33, meanwhile, the position of the 3D object 21 is moved toward the lower side of the Y-axis of the adjustment axes 25. When the user performs an operation to move the touch from the lower side toward the upper side of the touch pad 33, similarly, the position of the 3D object 21 is moved toward the upper side of the Y-axis of the adjustment axes 25.

In this manner, the adjustment process of moving the position of the 3D object 21 is performed in accordance with the direction of movement and the amount of movement of a touch operation by the user on the touch pad 33.

Figure 11:
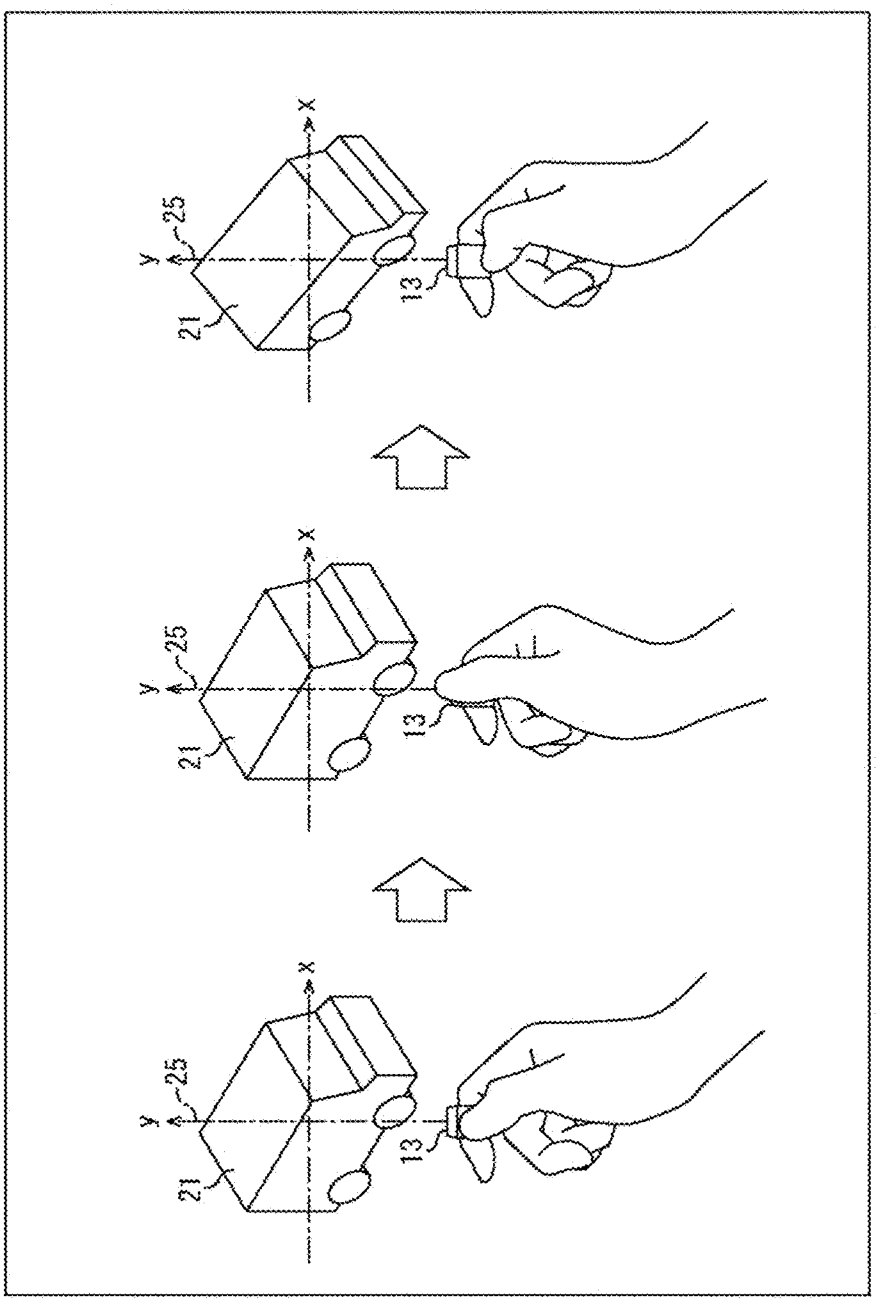
FIG. 11 illustrates an adjustment process of turning the attitude of a 3D object.

FIG. 11 illustrates an adjustment process of rotating the attitude of the 3D object 21.

When a transition is made to the adjustment mode, the adjustment axes 25 are displayed for the 3D object 21, as illustrated on the left side of FIG. 11, for example. Then, when the user touches the upper side of the touch pad 33 as illustrated in the center of FIG. 11 and performs an operation to move the touch to the lower side of the touch pad 33 as illustrated on the right side of FIG. 11 while maintaining the touch, the attitude of the 3D object 21 is turned toward the front side about the X-axis of the adjustment axes 25 in accordance with the amount of movement of the touch. At this time, even if the ring-type device 13 is tilted while the user is performing an operation to move the touch, the adjustment axes 25 are in a fixed state continuously while the touch is detected.

When the user performs an operation to move the touch from the lower side toward the upper side of the touch pad 33, the attitude of the 3D object 21 is turned toward the back side about the X-axis of the adjustment axes 25. When the user performs an operation to move the touch from the left side toward the right side of the touch pad 33, meanwhile, the attitude of the 3D object 21 is turned toward the right side about the Y-axis of the adjustment axes 25. When the user performs an operation to move the touch from the right side toward the left side of the touch pad 33, similarly, the attitude of the 3D object 21 is turned toward the left side about the Y-axis of the adjustment axes 25.

In this manner, the adjustment process of turning the attitude of the 3D object 21 is performed in accordance with the direction of movement and the amount of movement of a touch operation by the user on the touch pad 33.

Figure 12:
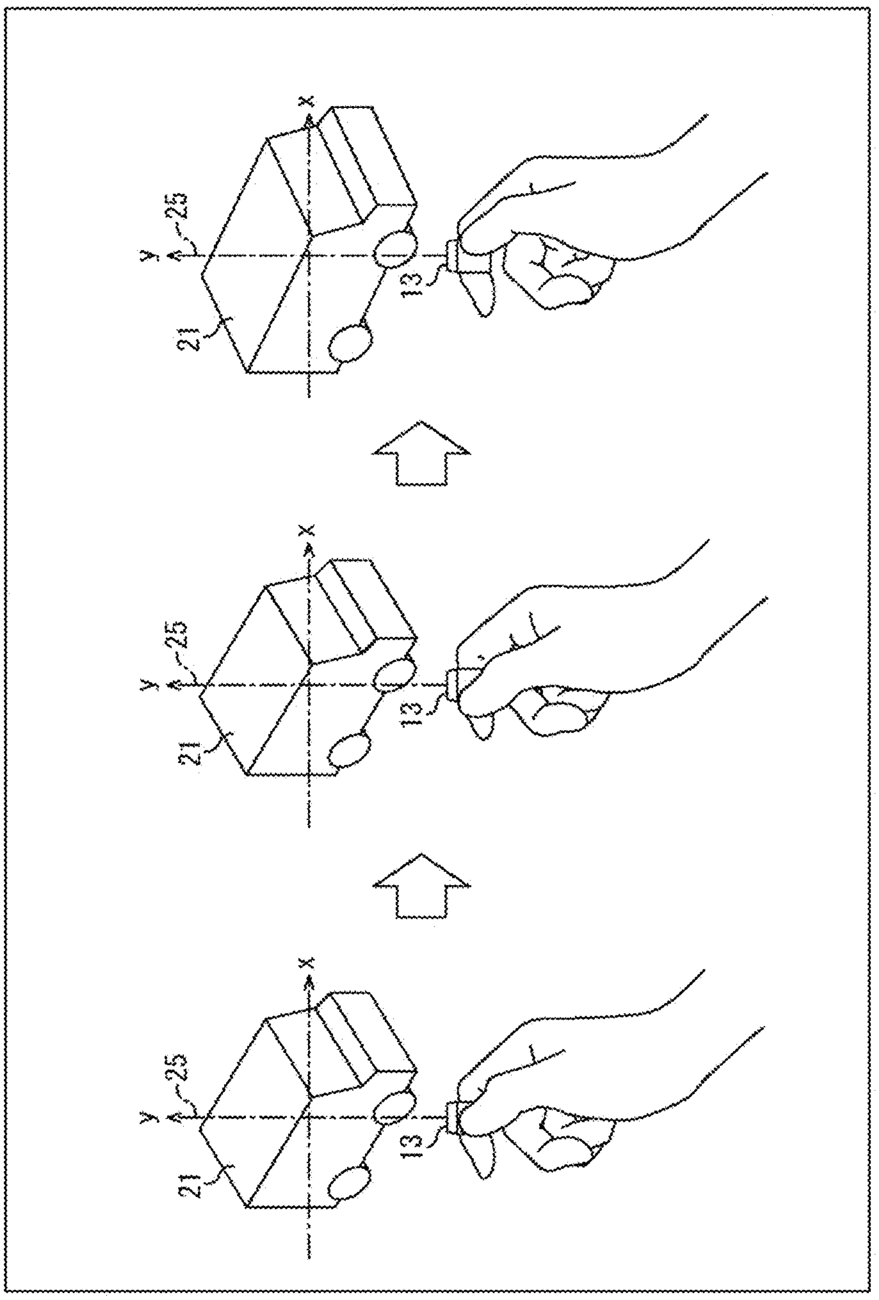
FIG. 12 illustrates an adjustment process of increasing/reducing the size of a 3D object.

FIG. 12 illustrates an adjustment process of increasing/reducing the size of the 3D object 21.

When a transition is made to the adjustment mode, the adjustment axes 25 are displayed for the 3D object 21, as illustrated on the left side of FIG. 12, for example. Then, when the user touches the left side of the touch pad 33 as illustrated in the center of FIG. 12 and performs an operation to move the touch to the right side of the touch pad 33 as illustrated on the right side of FIG. 12 while maintaining the touch, the size of the 3D object 21 is increased in a direction along the X-axis of the adjustment axes 25 in accordance with the amount of movement of the touch. At this time, even if the ring-type device 13 is tilted while the user is performing an operation to move the touch, the adjustment axes 25 are in a fixed state continuously while the touch is detected.

When the user performs an operation to move the touch from the right side toward the left side of the touch pad 33, the size of the 3D object 21 is reduced in a direction along the X-axis of the adjustment axes 25. When the user performs an operation to move the touch from the upper side toward the lower side of the touch pad 33, meanwhile, the size of the 3D object 21 is reduced in a direction along the Y-axis of the adjustment axes 25. When the user performs an operation to move the touch from the lower side toward the upper side of the touch pad 33, similarly, the size of the 3D object 21 is increased in a direction along the Y-axis of the adjustment axes 25.

In this manner, the adjustment process of increasing/reducing the size of the 3D object 21 is performed in accordance with the direction of movement and the amount of movement of a touch operation by the user on the touch pad 33.

<Process Example of 3D Object Adjustment Process>

Figure 13:
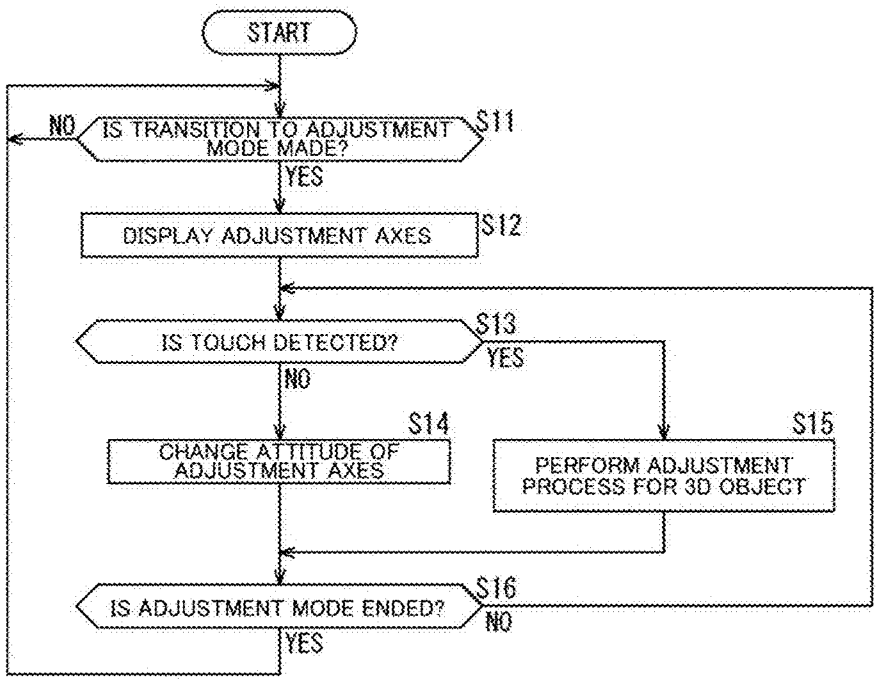
FIG. 13 is a flowchart illustrating a 3D object adjustment process.

A 3D object adjustment process performed in the AR system 11 will be described with reference to the flowchart illustrated in FIG. 13.

In step S11, the adjustment mode determination unit 82 determines whether or not to make a transition to an adjustment mode in which an adjustment process for the 3D object 21 is performed, on the basis of the sensor information supplied from the sensor information acquisition unit 81. For example, the adjustment mode determination unit 82 determines to make a transition to the adjustment mode when it is detected that the user moves his/her finger wearing the ring-type device 13 closer to the 3D object 21 and that the fingertip is located at a position within the adjustment mode determination range 24 and at which the fingertip is not in contact with the 3D object 21.

The process stands by until the adjustment mode determination unit 82 determines in step S11 to make a transition to the adjustment mode. When the adjustment mode determination unit 82 determines to make a transition to the adjustment mode, the process proceeds to step S12.

In step S12, the axis attitude determination unit 84 determines the attitude of the adjustment axes 25 at the timing when a transition is made to the adjustment mode, on the basis of the device position-attitude information on the ring-type device 13 supplied from the finger attitude determination unit 83. For example, the axis attitude determination unit 84 determines the attitude of the adjustment axes 25 so as to coincide with the attitude of the operation axes of the surface of the touch pad 33 at the timing when a transition is made to the adjustment mode. Then, the axis attitude determination unit 84 instructs the output control unit 87 to display the adjustment axes 25 at an attitude according to the determination, and the output control unit 87 supplies the visual display unit 73 with visual data on the adjustment axes 25 generated to be displayed at the attitude indicated by the axis attitude determination unit 84. Consequently, the adjustment axes 25 at an attitude that coincides with the attitude of the operation axes of the surface of the touch pad 33 at the timing when a transition is made to the adjustment mode are displayed at the origin of the local coordinate system 23 for the 3D object 21, as described with reference to FIG. 6 discussed above.

In step S13, the finger operation determination unit 85 determines whether or not a touch by the user on the touch pad 33 of the ring-type device 13 is detected, on the basis of the sensor information supplied from the sensor information acquisition unit 81.

When the finger operation determination unit 85 determines in step S13 that a touch by the user on the touch pad 33 of the ring-type device 13 is not detected, the process proceeds to step S14.

In step S14, the axis attitude determination unit 84 changes the attitude of the adjustment axes 25 in accordance with variations in the attitude of the operation axes of the surface of the touch pad 33, if there are any such variations, on the basis of the device position-attitude information on the ring-type device 13 supplied from the finger attitude determination unit 83. For example, the axis attitude determination unit 84 instructs the output control unit 87 to display the adjustment axes 25 at an attitude based on the device position-attitude information, and the output control unit 87 supplies the visual display unit 73 with visual data on the adjustment axes 25 generated to be displayed at the attitude indicated by the axis attitude determination unit 84. Consequently, the adjustment axes 25 are displayed with their attitude changed in accordance with variations in the attitude of the ring-type device 13, as described with reference to FIG. 7 discussed above.

When the finger operation determination unit 85 determines in step S13 that a touch by the user on the touch pad 33 of the ring-type device 13 is detected, on the other hand, the process proceeds to step S15.

In step S15, the adjustment processing unit 86 performs an adjustment process for the 3D object 21 on the basis of the touch position and the amount of movement of the touch on the touch pad 33 supplied from the finger operation determination unit 85 with the attitude of the adjustment axes 25 fixed. For example, when setting has been made to perform an adjustment process to move the position of the 3D object 21, the adjustment processing unit 86 instructs the output control unit 87 to display the 3D object 21 at a position after movement by an amount of movement based on the amount of movement of the touch. Accordingly, the output control unit 87 supplies the visual display unit 73 with visual data on the 3D object 21 generated to be displayed at the position indicated by the adjustment processing unit 86. Consequently, the 3D object 21 after being moved is displayed, as described with reference to FIG. 10 discussed above.

After the process in step S14 or S15, the process proceeds to step S16, and the adjustment mode determination unit 82 determines whether or not to end the adjustment mode in which an adjustment process for the 3D object 21 is performed, on the basis of the sensor information supplied from the sensor information acquisition unit 81. For example, the adjustment mode determination unit 82 determines to end the adjustment mode when it is detected that the user moves his/her finger wearing the ring-type device 13 away from the 3D object 21 and that the fingertip is located at a position outside the adjustment mode determination range 24.

When the adjustment mode determination unit 82 determines in step S16 not to end the adjustment mode, the process returns to step S13, and similar processes are repeatedly performed subsequently. When the adjustment mode determination unit 82 determines in step S16 to end the adjustment mode, on the other hand, the process returns to step S11, and similar processes are repeatedly performed subsequently.

In the AR system 11, as has been described above, an adjustment process for the 3D object 21 can be performed in the 3D object adjustment process, with the attitude of the adjustment axes 25 changed when the touch pad 33 is not touched and with the attitude of the adjustment axes 25 fixed when the touch pad 33 is touched. Consequently, it is possible to perform an adjustment process for the 3D object 21 as intended by the user, improving the operability of the 3D object 21.

Various Process Examples

Examples of various process that can be performed by the AR system 11 will be described with reference to FIGS. 14 to 21.

Figure 14:
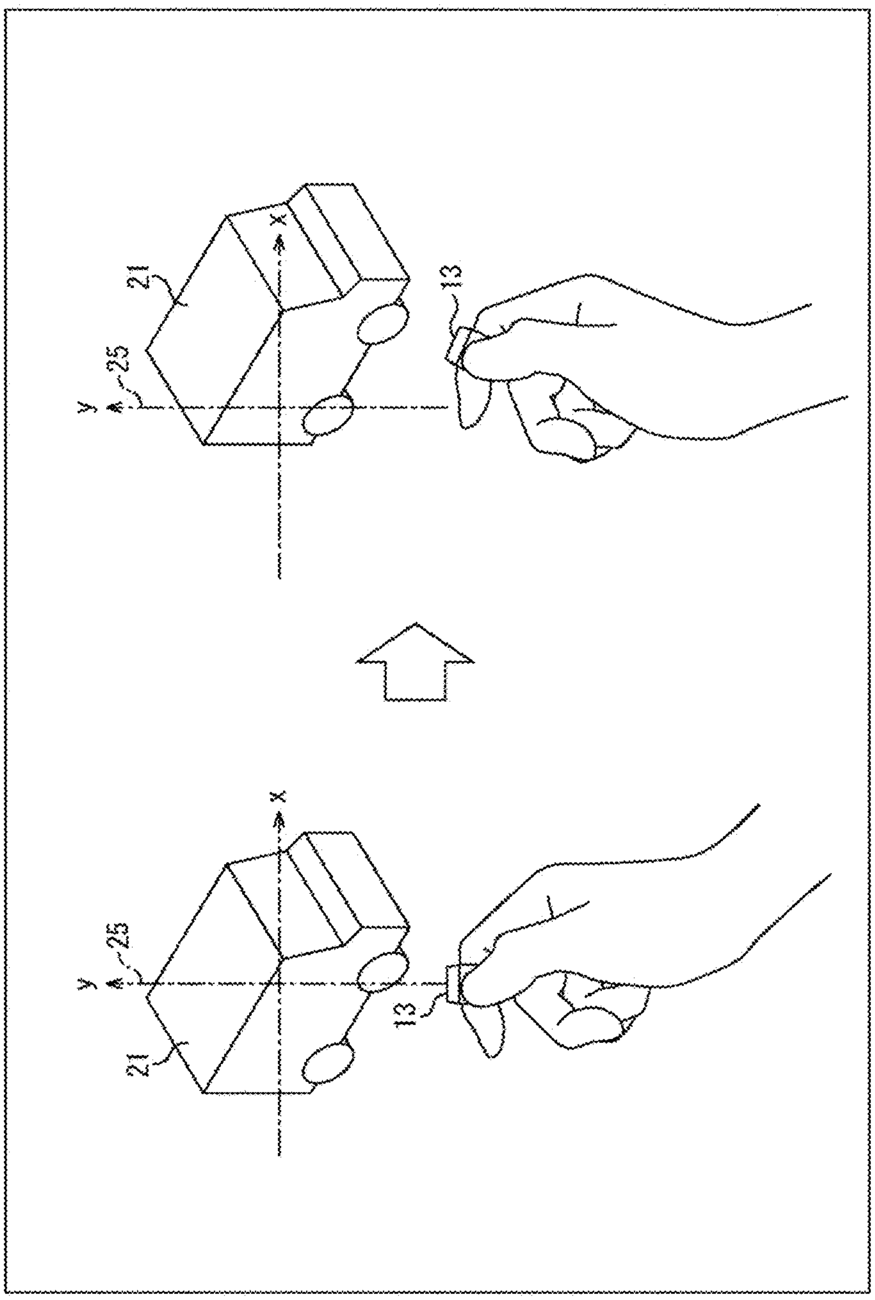
FIG. 14 illustrates another process example of the adjustment process of moving the position of a 3D object.

FIG. 14 illustrates another process example of the adjustment process of moving the position of the 3D object 21.

In the AR system 11, for example, the adjustment process of moving the position of the 3D object 21 can be performed by tilting the ring-type device 13, besides performing the adjustment process of moving the position of the 3D object 21 using the touch pad 33 as discussed above. That is, the adjustment processing unit 86 can move the position of the 3D object 21 in accordance with the tilt of the ring-type device 13 on the basis of the angular velocity data and the acceleration data on the ring-type device 13 acquired by the sensor information acquisition unit 81.

When a transition is made to the adjustment mode, the adjustment axes 25 are displayed for the 3D object 21, as illustrated on the left side of FIG. 14. Then, when the user tilts the ring-type device 13 rightward, the position of the 3D object 21 is moved toward the right side of the X-axis of the adjustment axes 25 in accordance with the tilt of the ring-type device 13, as illustrated on the right side of FIG. 14.

The adjustment process performed using a touch on the touch pad 33 and the adjustment process performed by tilting the ring-type device 13 may be combined with each other.

Further, the adjustment process can also be performed using operation means such as a pointing stick or a scroll wheel when the ring-type device 13 includes such operation means. Alternatively, even when the ring-type device 13 is not worn, the adjustment process can be performed by detecting motion of one finger in contact with another using a skin strain sensor, an electromyogram sensor, etc., or the adjustment process can be performed by detecting motion in the depth direction using a pressure sensor, etc., for example.

Figure 15:
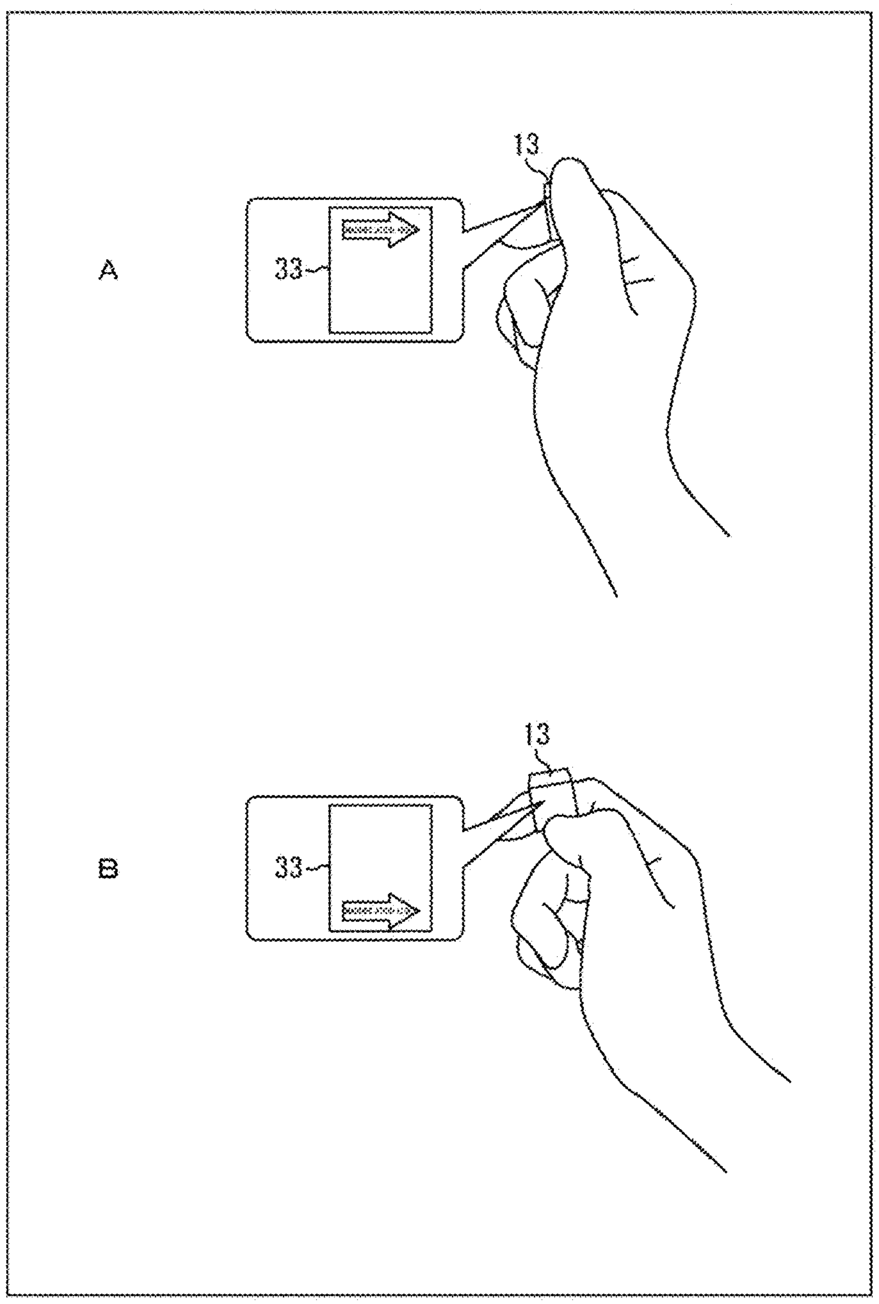
FIG. 15 illustrates the magnification in an adjustment process for a 3D object.

FIG. 15 illustrates the magnification in the adjustment process for the 3D object 21.

In the AR system 11, for example, the magnification of the amount of movement in the position of the 3D object 21 can be changed when the adjustment process is performed by touching the touch pad 33.

When the user performs an operation to give a touch in the vicinity of the upper side of the touch pad 33 and move the touch in the X-axis direction while keeping the touch as illustrated in A of FIG. 15, the position of the 3D object 21 can be moved significantly in the X-axis direction by multiplying a reference amount of movement that matches the amount of movement of the touch by a magnification of 1 or more.

When the user performs an operation to give a touch in the vicinity of the lower side of the touch pad 33 and move the touch in the X-axis direction while keeping the touch as illustrated in B of FIG. 15, the position of the 3D object 21 can be moved slightly in the X-axis direction by multiplying a reference amount of movement that matches the amount of movement of the touch by a magnification of 1 or less.

Similarly, when the user performs an operation to give a touch in the vicinity of the right side of the touch pad 33 and move the touch in the Y-axis direction while keeping the touch, the position of the 3D object 21 can be moved significantly in the Y-axis direction. When the user performs an operation to give a touch in the vicinity of the left side of the touch pad 33 and move the touch in the Y-axis direction while keeping the touch, meanwhile, the position of the 3D object 21 can be moved slightly in the Y-axis direction.

As with the magnification that is used to move the position of the 3D object 21, a magnification may be used, or may not be used, also for an amount of rotation that is used to turn the attitude of the 3D object 21 or an amount of increase or an amount of reduction that is used to increase/reduce the size of the 3D object 21.

The magnification may be varied in accordance with the size of the 3D object 21. For example, the position of the 3D object 21 can be moved significantly when the size of the 3D object 21 is large, and the position of the 3D object 21 can be moved slightly when the size of the 3D object 21 is small.

Figure 16:
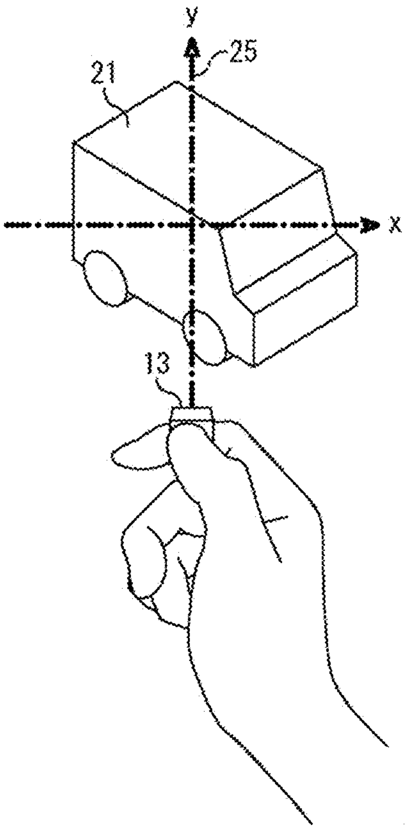
FIG. 16 illustrates an example of adjustment axes indicated by thick lines.

When the magnification in the adjustment process for the 3D object 21 is changed in this manner, the display on the user interface may be changed in order to cause the user to recognize such a change. For example, the adjustment axes 25 may be indicated by thick lines as illustrated in FIG. 16.

Before an adjustment process for the 3D object 21 is performed, the magnification may be changed in accordance with the time since a finger touches the touch pad 33 until the finger starts moving. For example, the magnification can be low when the finger starts moving soon after touching the touch pad 33, and the magnification can be high when the finger starts moving several seconds after touching the touch pad 33.

The magnification may be stored in advance in the ring-type device 13 for each user that uses the AR system 11. In this case, the adjustment process is performed using the magnification stored in the ring-type device 13 by recognizing the user wearing the ring-type device 13.

Figure 17:
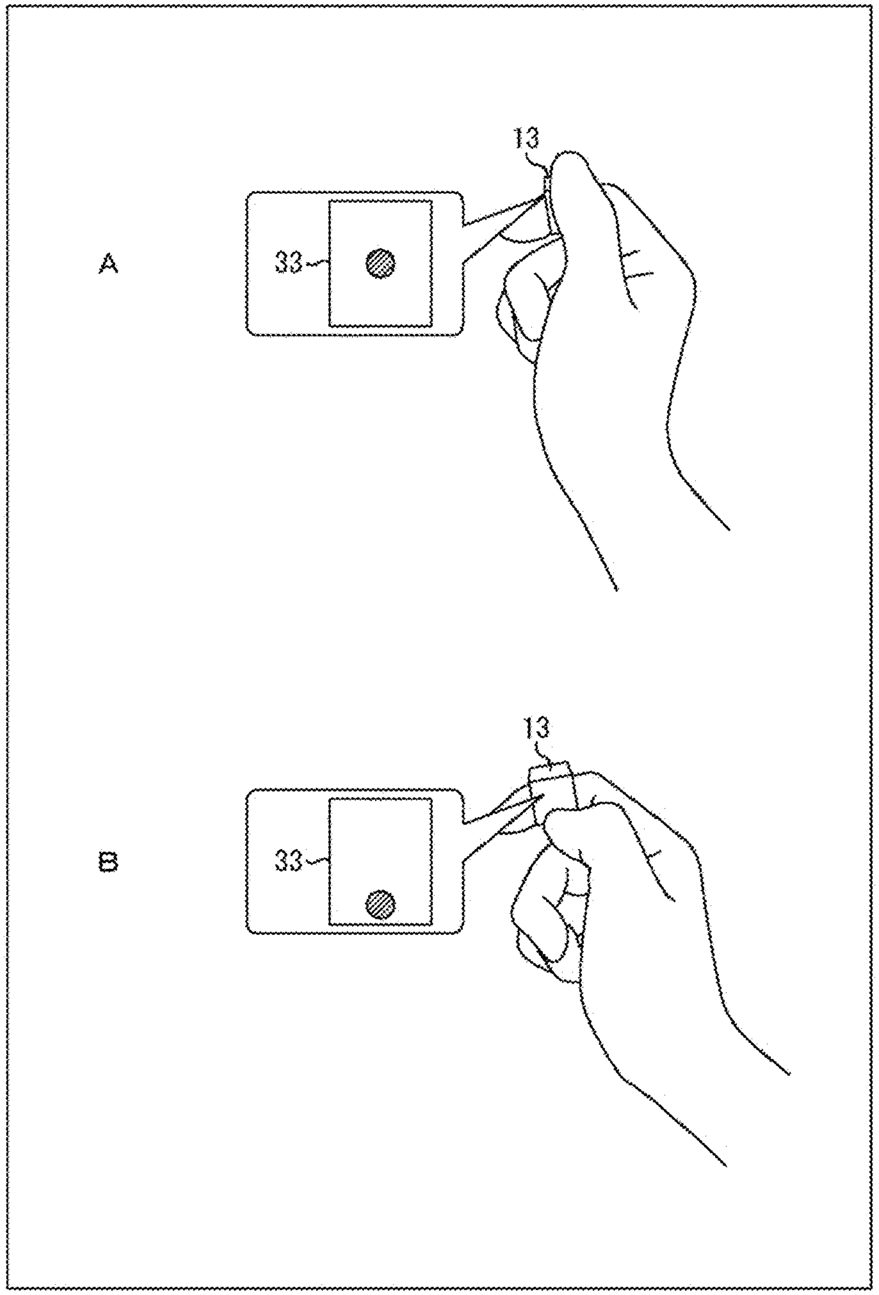
FIG. 17 illustrates assist in detection of a touch position on a touch pad.

FIG. 17 illustrates assist in detection of a touch position on the touch pad 33.

Occasionally, a touch position cannot be accurately detected when the user touches the upper side of the touch pad 33 and moves the touch position to the lower side of the touch pad 33 while keeping the touch, for example.

When the ball of the thumb contacts the touch pad 33 when the user starts a touch, even if the user intends to be in touch with the upper side of the touch pad 33, the center of the touch pad 33 is detected as the touch position, as illustrated in A of FIG. 17. Thus, in this case, only movement from the center to the lower side of the touch pad 33 is detected, even if the user moves the touch position toward the lower side, as illustrated in B of FIG. 17. That is, the touch operation by the user is not accurately detected.

Thus, in the AR system 11, detection of the touch position on the touch pad 33 can be assisted by detecting and tracking the position of the thumb of the user on the basis of a video of the fingers of the user captured by the camera 15. In the AR system 11, the touch position can be detected more accurately by using tracking based on a video in this manner.

Figure 18:
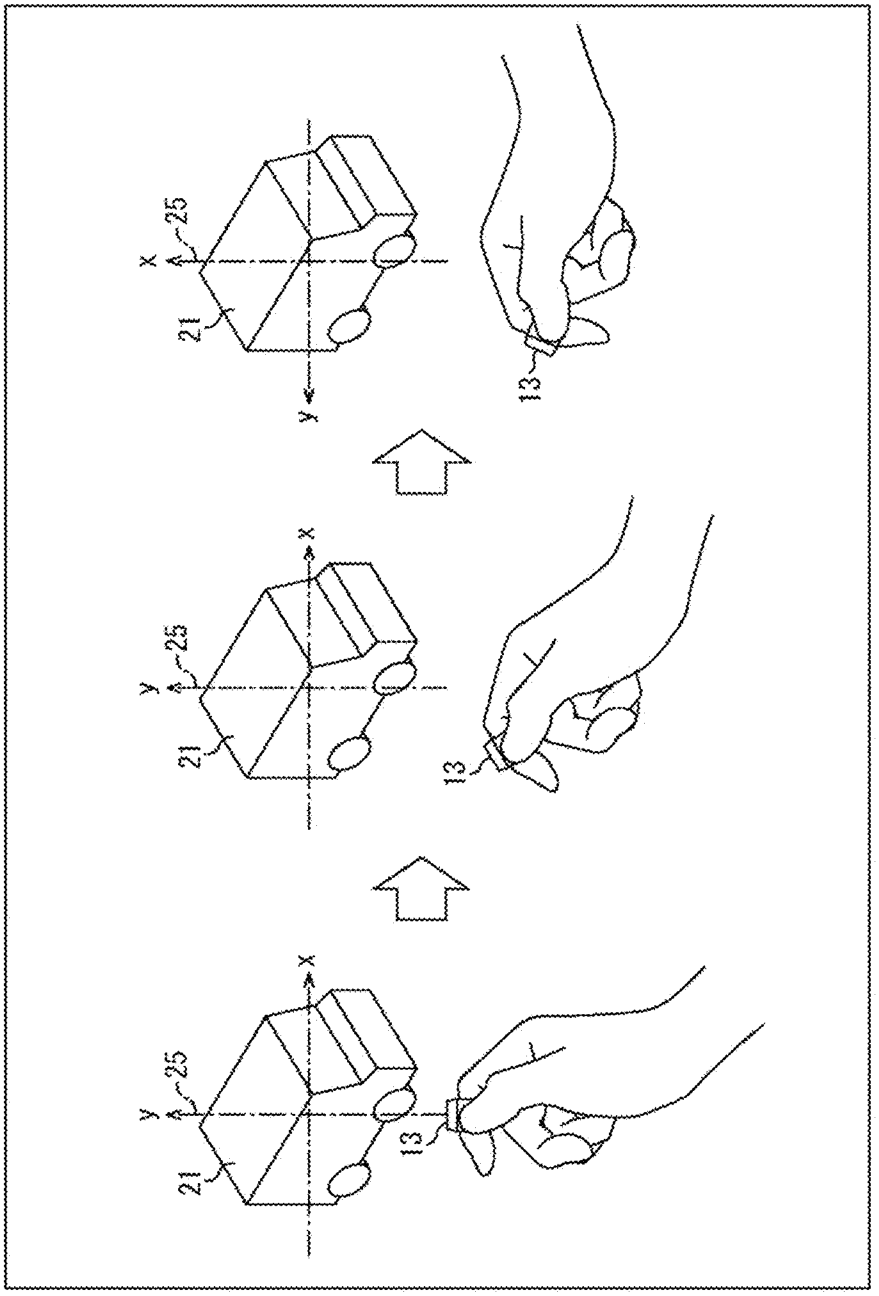
FIG. 18 illustrates a process of varying the attitude of adjustment axes by a predetermined angle each time.

FIG. 18 illustrates a process in which the attitude of the adjustment axes 25 is changed by a predetermined angle each time.

In the AR system 11, as discussed above, the attitude of the adjustment axes 25 can be freely changed to any angle in accordance with the attitude of the ring-type device 13. However, it is assumed that it is occasionally difficult to change the attitude of the adjustment axes 25 to a desired angle. Thus, in the AR system 11, the attitude of the adjustment axes 25 can be changed by a predetermined angle each time the ring-type device 13 is tilted to a certain angle or more, for example.

For example, FIG. 18 illustrates a process example of a process in which the attitude of the adjustment axes 25 is changed by 90° each time the ring-type device 13 is tilted to 45° or more. When a transition is made to the adjustment mode, the adjustment axes 25 are displayed for the 3D object 21, as illustrated on the left side of FIG. 18. When the ring-type device 13 is tilted to an angle of less than 45°, the attitude of the adjustment axes 25 is not changed, even if the user tilts the ring-type device 13, as illustrated in the center of FIG. 18. When the user further tilts the ring-type device 13 to 45° or more, the attitude of the adjustment axes 25 is changed by 90°, as illustrated on the right side of FIG. 18.

That is, when the ring-type device 13 is tilted rightward or leftward to an angle of less than 45°, the adjustment axes 25 are kept fixed, even if the ring-type device 13 is tilted. When the ring-type device 13 is tilted rightward or leftward to 45° or more, the attitude of the adjustment axes 25 can be turned rightward or leftward by 90°. Consequently, the attitude of the adjustment axes 25 can be accurately adjusted to the predetermined angle on either side.

As a matter of course, the changes in the attitude of the adjustment axes 25 are not limited to 90° each, and setting can be made such that the attitude of the adjustment axes 25 is changed by any predetermined angle (such as 45° or) 60° each time.

Figure 19:
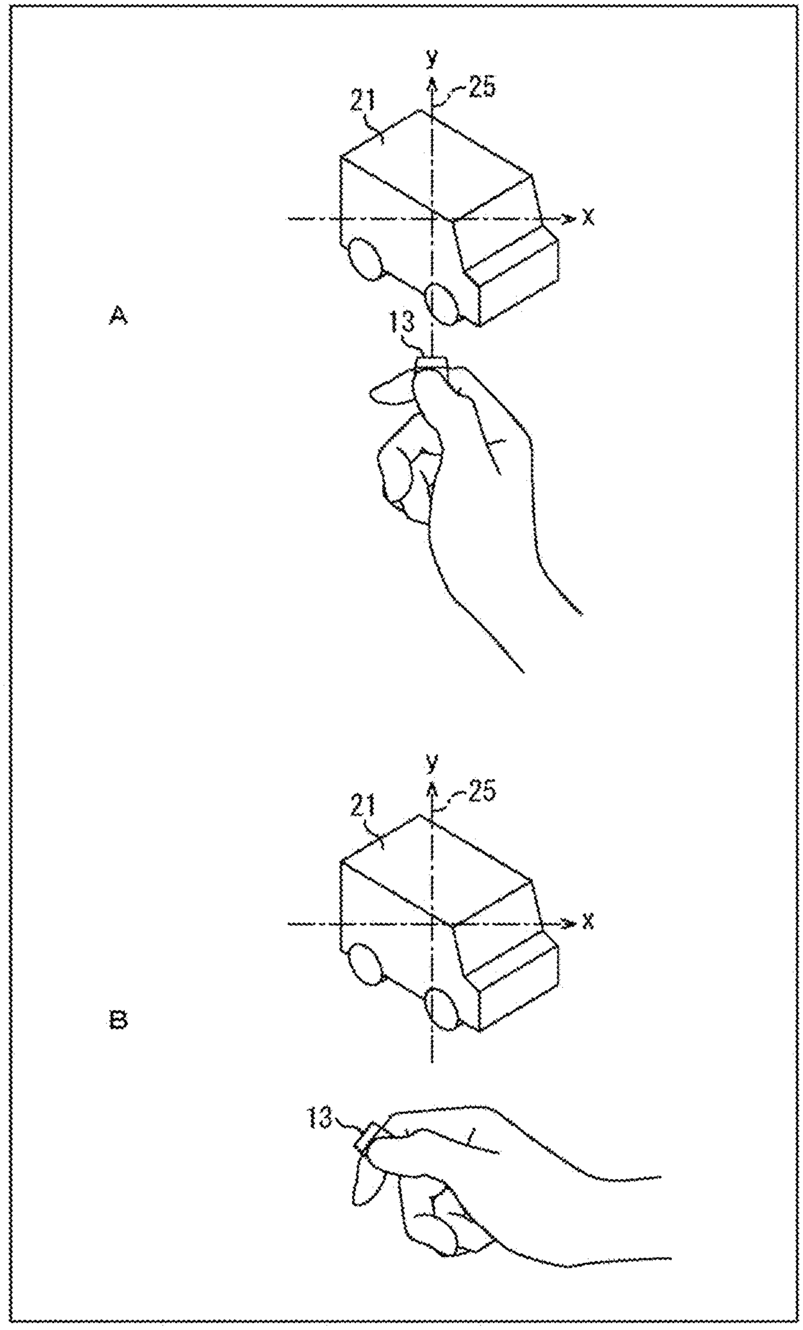
FIG. 19 illustrates a process of initially displaying adjustment axes in accordance with the default attitude.

FIG. 19 illustrates a process of initially displaying the adjustment axes 25 in accordance with the default attitude.

In the AR system 11, as discussed above, the adjustment axes 25 are displayed in accordance with the attitude of the touch pad 33 of the ring-type device 13 at the timing when a transition is made to the adjustment mode. When the attitude of the adjustment axes 25 initially displayed at the timing when a transition is made to the adjustment mode is different in accordance with the attitude of the touch pad 33 of the ring-type device 13, however, it is assumed that it is occasionally difficult to perform an adjustment process for the 3D object 21.

Thus, in the AR system 11, the adjustment axes 25 can be always initially displayed in accordance with the default attitude, irrespective of the attitude of the touch pad 33 of the ring-type device 13 at the timing when a transition is made to the adjustment mode. For example, an attitude at which the X-axis of the adjustment axes 25 is in the horizontal direction and the Y-axis of the adjustment axes 25 is in the vertical direction when the 3D object 21 is seen from the position of the user can be set as the default attitude for initially displaying the adjustment axes 25. The default attitude for initially displaying the adjustment axes 25 may be determined so as to match the result of estimating a psychological position and attitude of a hand of the user, for example.

For example, when a transition is made to the adjustment mode with the ring-type device 13 tilted as illustrated in A of FIG. 19, and when a transition is made to the adjustment mode with the ring-type device 13 tilted as illustrated in B of FIG. 19, the adjustment axes 25 can be displayed at the same attitude in either case by initially displaying the adjustment axes 25 in accordance with the default attitude. This allows the user to easily perform an adjustment process by naturally moving his/her hand closer to the 3D object 21.

Here, when offset is caused between the attitude of the adjustment axes 25 and the attitude of the operation axes of the touch pad 33 of the ring-type device 13 as illustrated in B of FIG. 19, the attitude of the adjustment axes 25 is changed while maintaining the offset when changing the attitude of the adjustment axes 25 after that. That is, the attitude of the adjustment axes 25 can be changed while maintaining the relative relationship illustrated in B of FIG. 19.

In the AR system 11, the direction of the Z-axis (not displayed) may be fixed so that the Z-axis is always in the direction of the user, for example.

In the AR system 11, further, the 3D object 21 may be initially displayed in accordance with the default attitude. For example, the default attitude for initially displaying the 3D object 21 can be set such that the Z-axis direction of the local coordinate system 23 for the 3D object 21 coincides with the Z-axis direction of the world coordinate system 22 when displaying the 3D object 21 with reference to the ring-type device 13. Consequently, the 3D object 21 is initially displayed such that the attitude of the 3D object 21 in the up-down direction is always the same when initially displaying the 3D object 21.

Figure 20:
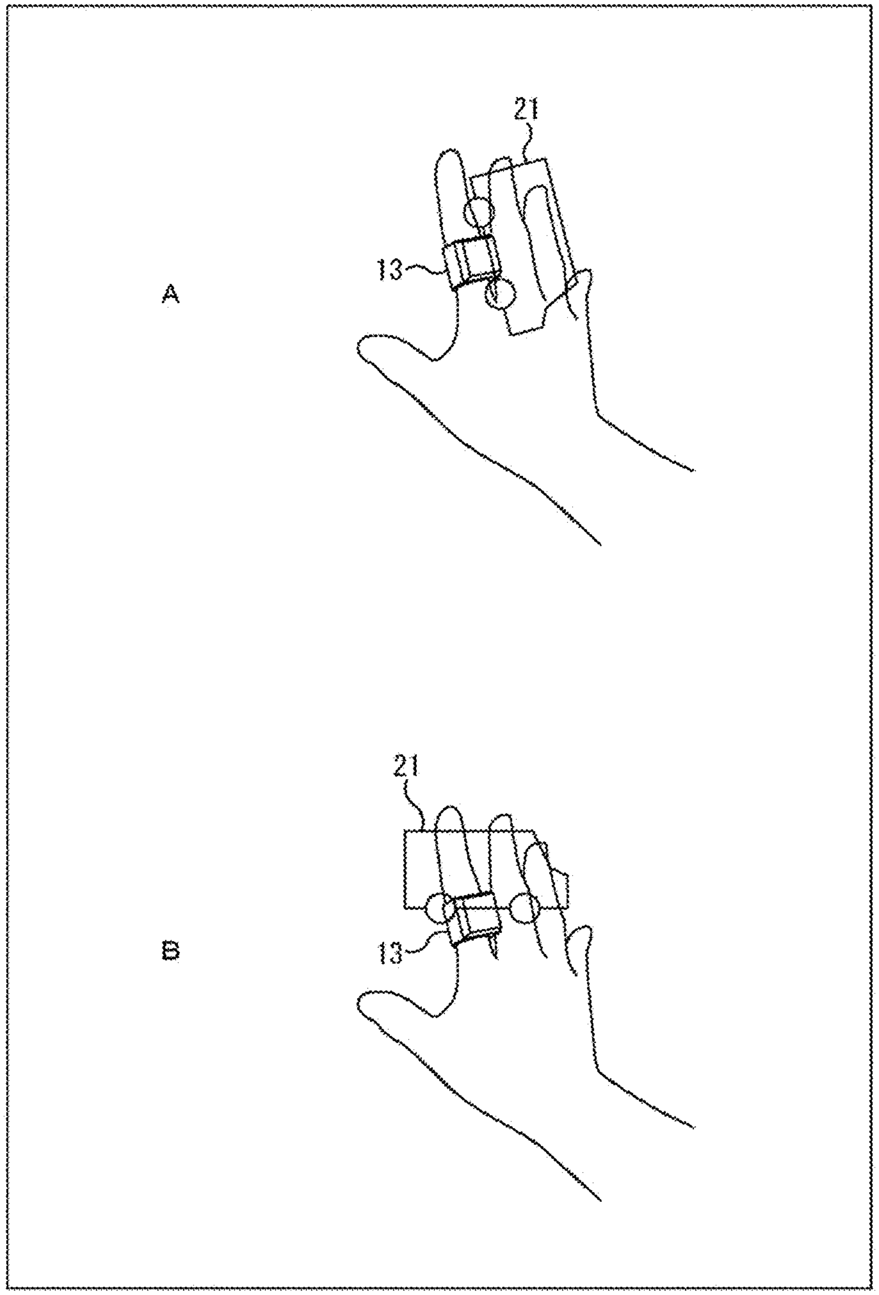
FIG. 20 illustrates an example in which a 3D object is initially displayed in accordance with the default attitude.

For example, when displaying the 3D object 21 with reference to the ring-type device 13, it is not expected to initially display the 3D object 21 in accordance with the attitude of the ring-type device 13 (i.e., such that the up-down direction of the 3D object 21 does not coincide with the Z-axis direction of the world coordinate system 22) as illustrated in A of FIG. 20. On the contrary, it is preferable to initially display the 3D object 21 in accordance with the default attitude such that the Z-axis direction of the local coordinate system 23 for the 3D object 21 coincides with the Z-axis direction of the world coordinate system 22 as illustrated in B of FIG. 20, irrespective of the attitude of the ring-type device 13. Consequently, the 3D object 21 is initially displayed such that the upper side in the Z-axis direction of the local coordinate system 23 for the 3D object 21 is always directed upward when the user sees the 3D object 21.

Selection of the 3D object 21 as the target for an adjustment process will be described with reference to FIG. 21.

In the AR system 11, for example, selection of the 3D object 21 as the target for an adjustment process can be changed in accordance with the touch position on the touch pad 33 of the ring-type device 13.

Figure 21:
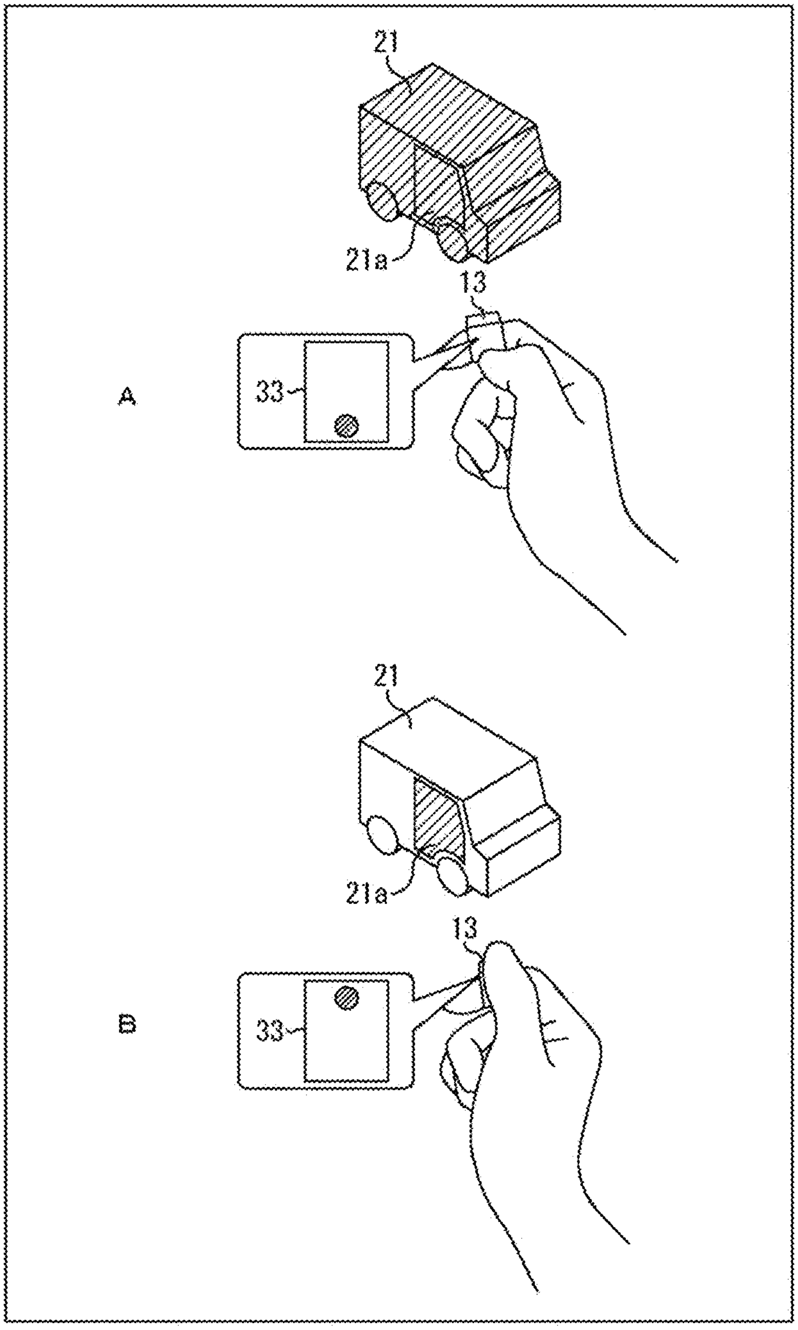
FIG. 21 illustrates selection of a 3D object as the target for an adjustment process.

FIG. 21 illustrates a process example in which the 3D object 21 is a vehicle and a 3D object 21*a* is a vehicle door. When the touch position on the touch pad 33 is on the lower side as illustrated in A of FIG. 21, for example, the 3D object 21 is selected as the target for an adjustment process. When the touch position on the touch pad 33 is on the upper side as illustrated in B of FIG. 21, meanwhile, the 3D object 21*a* is selected as the target for an adjustment process.

For example, it is possible to select the 3D object 21 which is larger when the user touches the lower side of the touch pad 33, and to select the 3D object 21*a* which is smaller when the user touches the upper side of the touch pad 33. This allows the user to select the 3D object 21 quickly and easily.

As a matter of course, the target to be selected may also be changed in accordance with the touch position on the touch pad 33 when selecting the 3D object 21 as the target for an operation to "grip" the 3D object 21 as in the related art, besides when selecting the 3D object 21 as the target for an adjustment process. Besides, the same can also be applied to an operation to switch the appearance of an object, an intensity simulation, or display of a layer such as temperature.

Here, while the ring-type device 13 is used to adjust the 3D object 21 in the present embodiment by way of example, devices other than the ring-type device 13 such as a glove-type device or a device shaped so as to cover a single finger as a whole can also be used. The touch pad 33 is also not limited to the one capable of two-axis detection discussed above, and one capable of single-axis detection may also be used.

Figure 22:
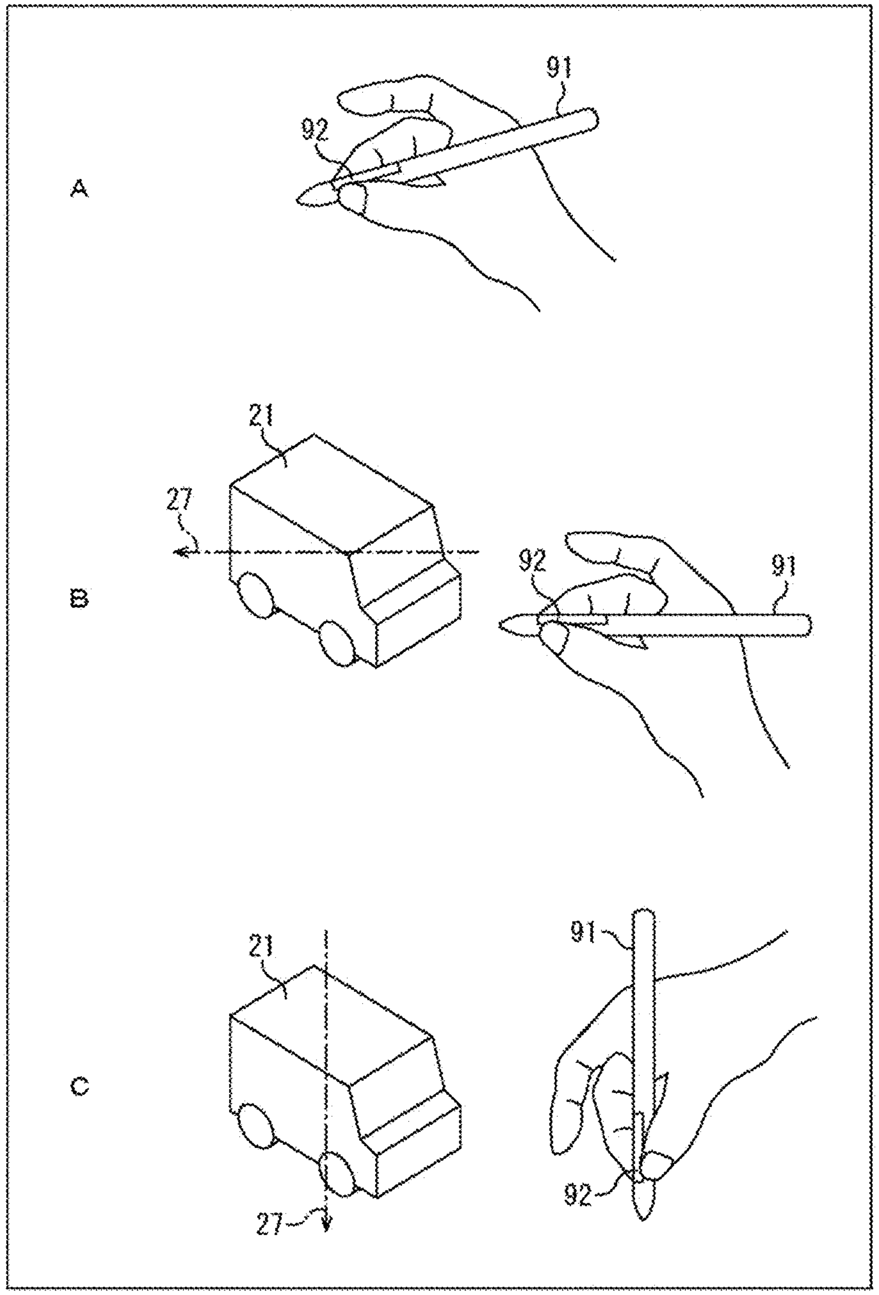
FIG. 22 illustrates a pen-type device.

For example, a pen-type device 91 may also be used as illustrated in FIG. 22. The pen-type device 91 is provided with a touch pad 92 capable of single-axis detection at a position in the vicinity of an index finger when held by the user. The pen-type device 91 is also provided with a tactile switch 34, although not illustrated.

To use the pen-type device 91, a single-axis adjustment axis 27 is displayed for the 3D object 21 in accordance with the tilt of the pen-type device 91, as illustrated in B of FIG. 22 and C of FIG. 22. An adjustment process for the 3D object 21 can be performed along the single-axis adjustment axis 27 displayed in this manner.

Figure 23:
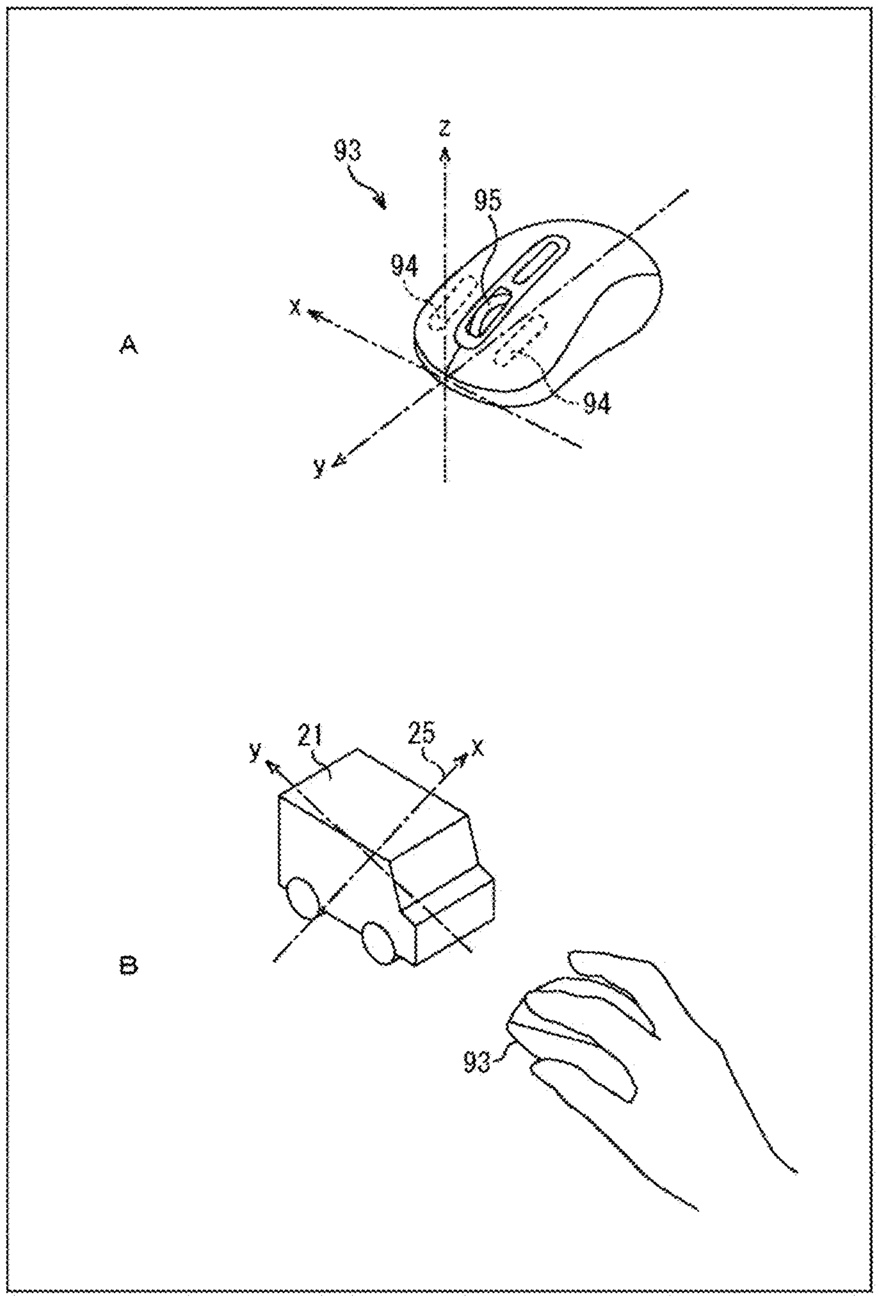
FIG. 23 illustrates a mouse-type device.

A mouse-type device 93 may also be used as illustrated in FIG. 23. For example, operation axes are set for the mouse-type device 93, centered on the center of the distal end of the mouse-type device 93, as illustrated in A of FIG. 23. Of the operation axes represented by three axes of X-axis, Y-axis, and Z-axis indicated in the drawing, operation axes represented by two axes of X-axis and Z-axis or X-axis and Y-axis, or an operation axis represented by a single axis, etc., are set.

For example, the user can perform an operation to perform an adjustment process for the 3D object 21 with the mouse-type device 93 lifted in the air. At this time, the adjustment axes 25 are displayed in accordance with the origin of the local coordinate system 23 for the 3D object 21 in accordance with the attitude of the mouse-type device 93 at the timing when a transition is made to the adjustment mode, as illustrated in B of FIG. 23. Then, after the adjustment axes 25 are fixed, an adjustment process for the 3D object 21 can be performed in accordance with the operation direction and the operation amount of an operation on operation units provided in the mouse-type device 93 such as capacitive touch pads 94 and a scroll wheel 95.

<Configuration Example of Computer>

The above-described series of processing (information processing method) can be executed by hardware or software. In a case where the series of processing is executed by software, a program that configures the software is installed in a general-purpose computer or the like.

Figure 24:
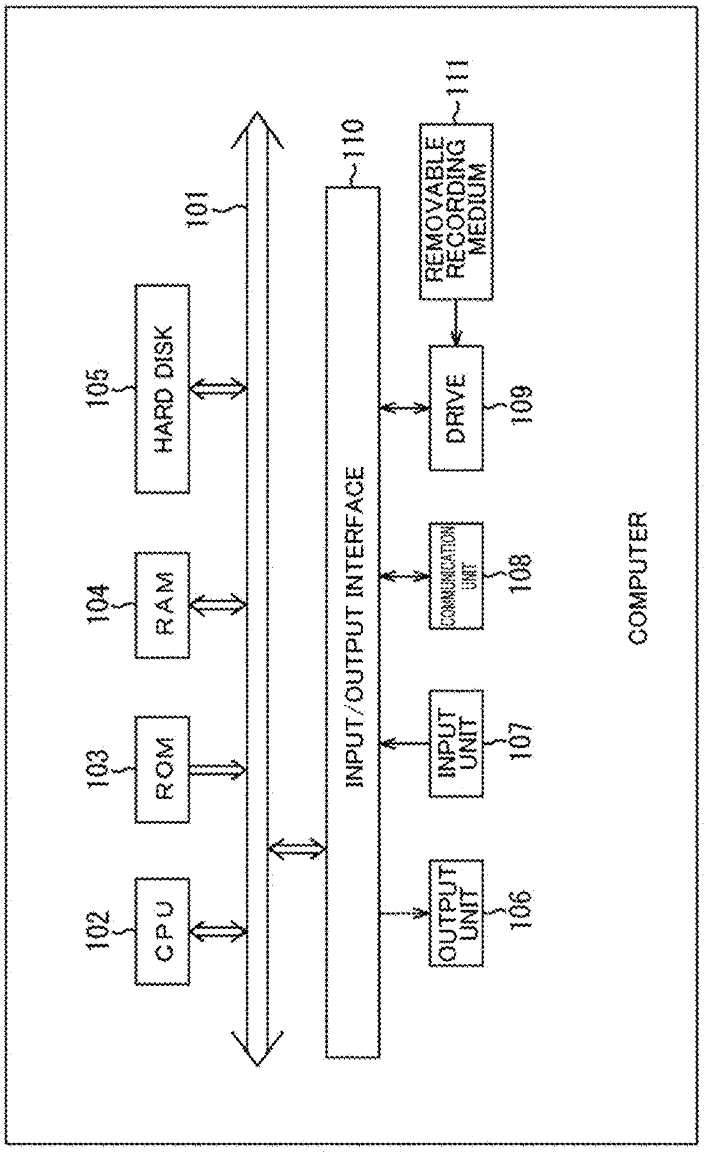
FIG. 24 is a block diagram illustrating an example of the configuration of an embodiment of a computer to which the present technology is applied.

FIG. 24 is a block diagram illustrating an exemplary configuration of an embodiment of a computer in which a program executing the above-described series of steps of processing is installed.

The program can be recorded in advance in the hard disk 105 or ROM 103 as a recording medium built into the computer.

Alternatively, the program can be stored (recorded) in removable recording medium 111 driven by drive 109. Such a removable recording medium 111 can be provided as so-called package software. Here, examples of the removable recording medium 111 include a flexible disc, a compact disc read-only memory (CD-ROM), a magneto-optical (MO) disc, a digital versatile disc (DVD), a magnetic disk, and a semiconductor memory.

The program can be installed in the computer from the removable recording medium 111 as described above, or can be downloaded to the computer via a communication network or broadcasting network and installed in the built-in hard disk 105. That is, for example, the program is transferred from the download site to the computer wirelessly via an artificial satellite for digital satellite broadcasting, or transferred to the computer by wire via a network such as a LAN (Local Area Network) or the Internet.

The computer contains a central processing unit (CPU) 102. An input/output interface 110 is connected to the CPU 102 via a bus 101.

When a user inputs an instruction by manipulating an input unit 107 through the input/output interface 110, the CPU 102 executes a program stored in a read-only memory (ROM) 103 in accordance with the instruction. Alternatively, the CPU 102 loads a program stored in the hard disk 105 into a random access memory (RAM) 104 and executes it.

As a result, the CPU 102 performs processing according to the above-described flowcharts or processing executed by components of the above-described block diagrams. Then, the CPU 102 causes an output unit 106 to output a processing result, causes a communication unit 108 to transmits the processing result, and causes the hard disk 105 to record the processing result, for example, via the input/output interface 110 as necessary.

The input unit 107 is composed of a keyboard, mouse, microphone, and the like. Further, the output unit 106 is configured by a liquid crystal display (LCD), a speaker, or the like.

The processing executed by the computer in accordance with the program described herein may not necessarily be executed chronologically in the order described as the flowcharts. In other words, the processing executed by the computer in accordance with the program also includes processing that is executed in parallel or individually (for example, parallel processing or processing by objects).

The program may be a program processed by one computer (processor) or may be distributed and processed by a plurality of computers. Furthermore, the program may be a program transmitted to a remote computer to be executed.

Moreover, in the present specification, a system means a collection of a plurality of constituent elements (including devices and modules (components)) regardless of whether all the constituent elements are contained in the same casing. Accordingly, a plurality of devices accommodated in separate casings and connected via a network and one device in which a plurality of modules are accommodated in one casing are all systems.

For example, a configuration described as one device (or processing unit) may be divided and configured as a plurality of devices (or processing units). On the other hand, the configuration described above as a plurality of devices (or processing units) may be collectively configured as one device (or processing unit). Further, of course, a configuration other than the above may be added to the configuration of each device (or each processing unit). Further, a part of the configuration of a device (or processing unit) may be included in the configuration of another device (or another processing unit) as long as the configuration or operation of the system as a whole is substantially the same.

Further, for example, the present technology may have a cloud computing configuration in which one function is shared with and processed by a plurality of devices via a network.

Further, for example, the above-described program can be executed in any device. In this case, the device only needs to have necessary functions (functional blocks, and the like) and to be able to obtain necessary information.

Further, for example, the respective steps described in the above-described flowchart may be executed by one device or in a shared manner by a plurality of devices. Furthermore, in a case where a plurality of steps of processing are included in one step, the plurality of steps of processing included in one step may be executed by one device or by a plurality of devices in a shared manner. In other words, it is also possible to execute the plurality of processing included in one step as processing of a plurality of steps. On the other hand, it is also possible to execute processing described as a plurality of steps collectively as one step.

For example, for a program executed by a computer, processing of steps describing the program may be performed chronologically in order described in the present specification or may be performed in parallel or individually at a necessary timing such as the time of calling. That is, the processing of the respective steps may be executed in an order different from the above-described order as long as there is no contradiction. Further, the processing of the steps describing this program may be executed in parallel with processing of another program, or may be executed in combination with the processing of the other program.

Note that the present technology described as various modes in the present description may be implemented independently alone as long as no contradiction arises. Of course, any plurality of technologies may be implemented together. For example, some or all of the present technologies described in several embodiments may be implemented in combination with some or all of the present technologies described in the other embodiments. A part or all of any above-described present technology can also be implemented together with another technology which has not been described above.

Combination Example of Configuration

The present disclosure can also be configured as follows.

(1)

An information processing device including:

an axis attitude determination unit that determines an attitude of an adjustment axis on the basis of an attitude of a finger of a user, the adjustment axis serving as a reference for performing an adjustment process for a 3D object disposed in a three-dimensional space on computer graphics so as to be superimposed on a real space, and that changes and fixes the attitude of the adjustment axis; and an adjustment processing unit that performs the adjustment process for the 3D object according to an operation by the user in accordance with an axial direction of the adjustment axis at the fixed attitude.

(2)

The information processing device according to (1), further including a sensor information acquisition unit that acquires sensor information supplied from a worn device worn on a finger of the user and having a touch pad that is used to input a touch operation, in which:

the axis attitude determination unit determines the attitude of the adjustment axis by estimating the attitude of the finger of the user on the basis of the sensor information that indicates acceleration data and angular velocity data detected by the worn device; and the adjustment processing unit performs the adjustment process for the 3D object on the basis of the sensor information that indicates a touch operation by the user on the touch pad.

(3)

The information processing device according to (2), in which:

the axis attitude determination unit changes the attitude of the adjustment axis when a touch on the touch pad is not detected, and fixes the attitude of the adjustment axis at a timing when a touch on the touch pad is detected; and the adjustment processing unit performs the adjustment process for the 3D object when a touch on the touch pad is detected.

(4)

The information processing device according to (3), in which the adjustment processing unit performs an adjustment process of moving a position of the 3D object, an adjustment process of turning an attitude of the 3D object, or an adjustment process of increasing/reducing a size of the 3D object.

(5)

The information processing device according to any one of (1) to (4), in which an adjustment mode determination range for determining an adjustment mode in which the adjustment process for the 3D object is performed is set in a certain range around the 3D object.

(6)

The information processing device according to (3), in which the axis attitude determination unit displays the adjustment axis in accordance with an attitude of the worn device at a timing when a transition is made to an adjustment mode in which the adjustment process for the 3D object is performed.

(7)

The information processing device according to (6), in which the axis attitude determination unit changes the attitude of the adjustment axis in accordance with the attitude of the worn device when the attitude of the worn device is varied when in the adjustment mode.

(8)

The information processing device according to (6) or (7), in which the axis attitude determination unit fixes the adjustment axis at an attitude at a timing when a predetermined operation is performed while the predetermined operation is performed by the user when in the adjustment mode.

(9)

The information processing device according to any one of (6) to (8), in which the axis attitude determination unit displays a user interface that indicates a designated angle set in advance when the present attitude of the adjustment axis is a certain angle or less from the designated angle.

(10)

The information processing device according to (3), in which the adjustment processing unit moves a position of the 3D object in accordance with a direction of movement and an amount of movement of the touch operation by the user on the touch pad on the basis of the sensor information that indicates the touch operation.

(11)

The information processing device according to (3), in which the adjustment processing unit turns an attitude of the 3D object in accordance with a direction of movement and an amount of movement of the touch operation by the user on the touch pad on the basis of the sensor information that indicates the touch operation.

(12)

The information processing device according to (3), in which the adjustment processing unit increases or reduces a size of the 3D object in accordance with a direction of movement and an amount of movement of the touch operation by the user on the touch pad on the basis of the sensor information that indicates the touch operation.

(13)

The information processing device according to (3), in which the adjustment processing unit moves a position of the 3D object in accordance with a tilt of the worn device on the basis of the sensor information that indicates the acceleration data and the angular velocity data detected by the worn device.

(14)

The information processing device according to (3), in which the adjustment processing unit changes a magnification of an amount of movement when moving position of the 3D object in accordance with a touch position by the user on the touch pad.

(15)

The information processing device according to (14), in which display of the adjustment axis is changed when the magnification is changed.

(16)

The information processing device according to (3), in which tracking based on a video that captures a finger of the user is used to assist detection of a touch position by the user on the touch pad.

(17)

The information processing device according to (3), in which the axis attitude determination unit changes the attitude of the adjustment axis by a predetermined angle each time the worn device is tilted by a certain angle or more.

(18)

The information processing device according to (3), in which the axis attitude determination unit displays the adjustment axis in accordance with a predetermined default attitude when initially displaying the adjustment axis when a transition is made to an adjustment mode in which the adjustment process for the 3D object is performed.

(19)

The information processing device according to (3), in which selection of the 3D object as a target to be processed is changed in accordance with a touch position by the user on the touch pad.

(20)

An information processing method that causes an information processing device to perform a process including:

determining an attitude of an adjustment axis on the basis of an attitude of a finger of a user, the adjustment axis serving as a reference for performing an adjustment process for a 3D object disposed in a three-dimensional space on computer graphics so as to be superimposed on a real space, and changing and fixing the attitude of the adjustment axis; and performing the adjustment process for the 3D object according to an operation by the user in accordance with an axial direction of the adjustment axis at the fixed attitude.

Note that embodiments of the present disclosure are not limited to the above-mentioned embodiments and can be modified in various manners without departing from the scope and spirit of the present disclosure. The advantageous effects described in the present specification are merely exemplary and are not limitative, and other advantageous effects may be achieved.

REFERENCE SIGNS LIST

11 AR system
12 Glasses-type wearable terminal
13 Ring-type device
14 Transmissive display unit
15 Camera
21 3D object
22 World coordinate system
23 Local coordinate system
24 Adjustment mode determination range
25 Adjustment axis
31 Body portion
32 Belt portion
33 Touch pad
34 Tactile switch
41 Battery
42 Vibration actuator
43 Audio module
44 IMU
45 Wireless communication substrate
51 Display
52 Speaker
53 Sensor
54 Device body
55 CPU
56 Memory
57 Communication device
58 Input/output interface
61 Vibrator
62 Sensor
63 Device body
64 CPU
65 Memory
66 Communication device
67 Input/output interface
71 Sensor control unit
72 Information processing unit
73 Visual display unit
74 Tactile presentation unit
75 Sound presentation unit
81 Sensor information acquisition unit
82 Adjustment mode determination unit
83 Finger attitude determination unit
84 Axis attitude determination unit

85 Finger operation determination unit
86 Adjustment processing unit
87 Output control unit
91 Pen-type device
92 Touch pad
93 Mouse-type device
94 Capacitive touch pad
95 Scroll wheel

The invention claimed is:

1. An information processing device comprising:

circuitry configured to:

determine an attitude of an adjustment axis based on an attitude of a finger of a user, the adjustment axis serving as a reference for performing an adjustment process for a 3D object disposed in a three-dimensional space defined by computer graphics, the 3D object being displayed so as to be superimposed on a real space;

change the attitude of the adjustment axis based on the attitude of the finger of the user;

fix the attitude of the adjustment axis at a fixed attitude in response to a predetermined operation by the user; and perform the adjustment process for the 3D object according to an operation by the user in accordance with an axial direction of the adjustment axis at the fixed attitude.

2. The information processing device according to claim 1, wherein the circuitry is further configured to:

acquire sensor information supplied from a worn device worn on a finger of the user and having a touch pad that is used to input a touch operation;

determine the attitude of the adjustment axis by estimating the attitude of the finger of the user based on the sensor information that indicates acceleration data and angular velocity data detected by the worn device; and perform the adjustment process for the 3D object based on the sensor information that indicates a touch operation by the user on the touch pad.

3. The information processing device according to claim 2, wherein:

the circuitry is configured to change the attitude of the adjustment axis when a touch on the touch pad is not detected, and fix the attitude of the adjustment axis at a timing when a touch on the touch pad is detected; and the circuitry is configured to perform the adjustment process for the 3D object when a touch on the touch pad is detected.

4. The information processing device according to claim 3, wherein the circuitry is configured to perform an adjustment process of moving a position of the 3D object, an adjustment process of turning an attitude of the 3D object, or an adjustment process of increasing/reducing a size of the 3D object.

5. The information processing device according to claim 1, wherein an adjustment mode determination range for determining an adjustment mode in which the adjustment process for the 3D object is performed is set in a certain range around the 3D object.

6. The information processing device according to claim 3, wherein the circuitry is configured to display the adjustment axis in accordance with an attitude of the worn device at a timing when a transition is made to an adjustment mode in which the adjustment process for the 3D object is performed.

7. The information processing device according to claim 6, wherein the circuitry is configured to change the attitude of the adjustment axis in accordance with the attitude of the worn device when the attitude of the worn device is varied when in the adjustment mode.

8. The information processing device according to claim 6, wherein the circuitry is configured to fix the adjustment axis at an attitude at a timing when a predetermined operation is performed while the predetermined operation is performed by the user when in the adjustment mode.

9. The information processing device according to claim 6, wherein the circuitry is configured to display a user interface that indicates a designated angle set in advance when the present attitude of the adjustment axis is a certain angle or less from the designated angle.

10. The information processing device according to claim 3, wherein the circuitry is configured to move a position of the 3D object in accordance with a direction of movement and an amount of movement of the touch operation by the user on the touch pad based on the sensor information that indicates the touch operation.

11. The information processing device according to claim 3, wherein the circuitry is configured to turn an attitude of the 3D object in accordance with a direction of movement and an amount of movement of the touch operation by the user on the touch pad based on the sensor information that indicates the touch operation.

12. The information processing device according to claim 3, wherein the circuitry is configured to increase or reduce a size of the 3D object in accordance with a direction of movement and an amount of movement of the touch operation by the user on the touch pad based on the sensor information that indicates the touch operation.

13. The information processing device according to claim 3, wherein the circuitry is configured to move a position of the 3D object in accordance with a tilt of the worn device based on the sensor information that indicates the acceleration data and the angular velocity data detected by the worn device.

14. The information processing device according to claim 3, wherein the circuitry is configured to change a magnification of an amount of movement when moving position of the 3D object in accordance with a touch position by the user on the touch pad.

15. The information processing device according to claim 14, wherein display of the adjustment axis is changed when the magnification is changed.

16. The information processing device according to claim 3, wherein tracking based on a video that captures a finger of the user is used to assist detection of a touch position by the user on the touch pad.

17. The information processing device according to claim 3, wherein the circuitry is configured to change the attitude of the adjustment axis by a predetermined angle each time the worn device is tilted by a certain angle or more.

18. The information processing device according to claim 3, wherein the circuitry is configured to displaysdisplay the adjustment axis in accordance with a predetermined default attitude when initially displaying the adjustment axis when a transition is made to an adjustment mode in which the adjustment process for the 3D object is performed.

19. The information processing device according to claim 3, wherein selection of the 3D object as a target to be processed is changed in accordance with a touch position by the user on the touch pad.

20. An information processing method that causes an information processing device to perform a process comprising:

determining an attitude of an adjustment axis based on an attitude of a finger of a user, the adjustment axis serving as a reference for performing an adjustment process for a 3D object disposed in a three-dimensional space defined by computer graphics, the 3D object being displayed so as to be superimposed on a real space;

changing the attitude of the adjustment axis based on the attitude of the finger of the user;

fixing the attitude of the adjustment axis at a fixed attitude in response to a predetermined operation by the user; and performing the adjustment process for the 3D object according to an operation by the user in accordance with an axial direction of the adjustment axis at the fixed attitude.

* * * * *